(12) United States Patent
Breier et al.

(10) Patent No.: US 12,524,725 B2
(45) Date of Patent: Jan. 13, 2026

(54) DEVICE-BASED PRODUCTIVITY SYSTEM

(71) Applicant: HONEYWELL INTERNATIONAL INC., Charlotte, NC (US)

(72) Inventors: Eric Breier, Atlanta, GA (US); Lauren Duxbury, Atlanta, GA (US); Ashoomi Dholakia, Atlanta, GA (US); Muthu Saberethinam, Atlanta, GA (US); Ankur Manake, Suwanee, GA (US); John Fouts, Atlanta, GA (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 249 days.

(21) Appl. No.: 17/530,176

(22) Filed: Nov. 18, 2021

(65) Prior Publication Data
US 2022/0358444 A1 Nov. 10, 2022

Related U.S. Application Data

(60) Provisional application No. 63/183,930, filed on May 4, 2021.

(51) Int. Cl.
G06Q 10/00 (2023.01)
G06F 3/00 (2006.01)
(Continued)

(52) U.S. Cl.
CPC ....... G06Q 10/0639 (2013.01); G06F 3/0482 (2013.01); G06F 16/29 (2019.01);
(Continued)

(58) Field of Classification Search
CPC .......................................... G06Q 10/00–50/00
(Continued)

(56) References Cited

U.S. PATENT DOCUMENTS 9,055,120 B1  6/2015  Firman
9,148,473 B1  9/2015  Sharma
(Continued)

FOREIGN PATENT DOCUMENTS

CA    3047016 A1    6/2018
WO    2018/107290 A1    6/2018

OTHER PUBLICATIONS

Advisory Action (PTOL-303) Mailed on Apr. 14, 2023 for U.S. Appl. No. 17/530,204, 3 page(s).
(Continued)

Primary Examiner — Mustafa Iqbal
(74) Attorney, Agent, or Firm — ALSTON & BIRD LLP

(57) ABSTRACT

Disclosed herein are various embodiments for a device-based productivity system. An embodiment operates by determining a device type of a device corresponding to an account logged in through the device. A highest priority key performance indicator of a plurality of key performance indicators associated with the account is identified, each key performance indicator being linked with one or more actions that increases a value of the respective key performance indicator upon performance. An action associated with the highest priority key performance indicator that is actionable from the device of the determined device type based on a filter of the one or more actions corresponding to the highest priority key performance indicator is identified. The action is provided for display on a user interface on the device.

20 Claims, 17 Drawing Sheets

(51) Int. Cl.
*G06F 3/0482* (2013.01)
*G06F 16/00* (2019.01)
*G06F 16/29* (2019.01)
*G06Q 10/0631* (2023.01)
*G06Q 10/0633* (2023.01)
*G06Q 10/0637* (2023.01)
*G06Q 10/0639* (2023.01)

(52) U.S. Cl.
CPC .............. *G06Q 10/063112* (2013.01); *G06Q 10/063114* (2013.01); *G06Q 10/06316* (2013.01); *G06Q 10/0633* (2013.01); *G06Q 10/06375* (2013.01); *G06Q 10/06393* (2013.01); *G06Q 10/06398* (2013.01); *G06F 2203/04806* (2013.01)

(58) Field of Classification Search
USPC ................................................ 705/7.11–7.42
See application file for complete search history.

(56) References Cited

U.S. PATENT DOCUMENTS

| | | | |
|---|---|---|---|
| 9,626,183 | B1 | 4/2017 | Smith et al. |
| 11,087,261 | B1 | 8/2021 | Basu et al. |
| 11,375,027 | B1 | 6/2022 | Ramanathan et al. |
| 11,842,810 | B1 | 12/2023 | Trees et al. |
| 2006/0156307 | A1 | 7/2006 | Kunjithapatham et al. |
| 2009/0083058 | A1* | 3/2009 | Beringer ............. G06Q 10/067 705/348 |
| 2010/0159966 | A1* | 6/2010 | Friedman ............. G06F 3/0482 715/769 |
| 2015/0105878 | A1 | 4/2015 | Jones et al. |
| 2015/0154526 | A1 | 6/2015 | Yates et al. |
| 2015/0310371 | A1 | 10/2015 | Byrne et al. |
| 2016/0125471 | A1* | 5/2016 | Hsu .................... G06Q 30/0269 705/14.66 |
| 2016/0349960 | A1 | 12/2016 | Kumar et al. |
| 2017/0322782 | A1 | 11/2017 | Pakiman et al. |
| 2017/0329614 | A1* | 11/2017 | Schon .................. G06F 3/0481 |
| 2017/0358305 | A1 | 12/2017 | Kudurshian et al. |
| 2018/0039261 | A1 | 2/2018 | Haller et al. |
| 2018/0217720 | A1 | 8/2018 | Perez et al. |
| 2020/0042915 | A1 | 2/2020 | Samson |
| 2020/0104775 | A1* | 4/2020 | Chintalapati ......... G06T 11/206 |
| 2020/0186435 | A1 | 6/2020 | Hardy et al. |
| 2021/0151205 | A1 | 5/2021 | Li |
| 2021/0390476 | A1 | 12/2021 | Kono et al. |
| 2022/0091681 | A1* | 3/2022 | Darmour ................ G06F 3/011 |
| 2022/0114463 | A1 | 4/2022 | Tumuluri |
| 2022/0156667 | A1 | 5/2022 | Bellenguez |
| 2023/0397960 | A1 | 12/2023 | Shelton et al. |

OTHER PUBLICATIONS

Advisory Action (PTOL-303) Mailed on Sep. 29, 2023 for U.S. Appl. No. 17/530,182, 3 page(s).
Final Rejection Mailed on Apr. 11, 2024 for U.S. Appl. No. 17/530,182, 18 page(s).
Final Rejection Mailed on Feb. 8, 2024 for U.S. Appl. No. 17/530,204, 16 page(s).
Final Rejection Mailed on Jan. 23, 2023 for U.S. Appl. No. 17/530,204, 20 page(s).
Final Rejection Mailed on Jul. 26, 2023 for U.S. Appl. No. 17/530,182, 19 page(s).
Final Rejection Mailed on Oct. 19, 2023 for U.S. Appl. No. 17/530,186, 21 page(s).
Non-Final Rejection Mailed on Apr. 25, 2024 for U.S. Appl. No. 17/530,186, 24 page(s).
Non-Final Rejection Mailed on Dec. 21, 2023 for U.S. Appl. No. 17/530,182, 17 page(s).
Non-Final Rejection Mailed on Jan. 3, 2023 for U.S. Appl. No. 17/530,182, 18 page(s).
Non-Final Rejection Mailed on Jan. 17, 2024 for U.S. Appl. No. 17/530,195, 13 page(s).
Non-Final Rejection Mailed on Jul. 1, 2022 for U.S. Appl. No. 17/530,204, 17 page(s).
Non-Final Rejection Mailed on Jun. 8, 2023 for U.S. Appl. No. 17/530,186, 18 page(s).
Non-Final Rejection Mailed on Sep. 20, 2023 for U.S. Appl. No. 17/530,204, 9 page(s).
Advisory Action (PTOL-303) Mailed on Jun. 21, 2024 for U.S. Appl. No. 17/530,182, 3 page(s).
Non-Final Rejection Mailed on Jun. 17, 2024 for U.S. Appl. No. 17/530,204, 17 page(s).
Final Rejection Mailed on May 24, 2024 for U.S. Appl. No. 17/530,195, 17 page(s).
Advisory Action (PTOL-303) Mailed on Jul. 25, 2024 for U.S. Appl. No. 17/530,195, 3 page(s).
Non-Final Rejection Mailed on Jul. 30, 2024 for U.S. Appl. No. 17/530,182, 19 page(s).
Final Rejection Mailed on Aug. 7, 2024 for U.S. Appl. No. 17/530,186, 26 page(s).
Advisory Action (PTOL-303) Mailed on Nov. 4, 2024 for U.S. Appl. No. 17/530,186, 3 page(s).
Final Rejection Mailed on Nov. 13, 2024 for U.S. Appl. No. 17/530,204, 7 page(s).
Non-Final Rejection Mailed on Nov. 4, 2024 for U.S. Appl. No. 17/530,195, 16 page(s).
Final Rejection Mailed on Mar. 13, 2025 for U.S. Appl. No. 17/530,195, 21 page(s).
Non-Final Rejection Mailed on Feb. 26, 2025 for U.S. Appl. No. 17/530,204, 17 page(s).
Advisory Action (PTOL-303) Mailed on Feb. 3, 2025 for U.S. Appl. No. 17/530,204, 4 page(s).
Bellavista P, Corradi A, Foschini L, Ianniello R. Scalable and Cost-Effective Assignment of Mobile Crowdsensing Tasks Based on Profiling Trends and Prediction: The ParticipAct Living Lab Experience. Sensors (Basel). Jul. 30, 2015; 15(8): 18613-40. (Year: 2015).
Kanishk Bhadani, et. al., "Development and implementation of key performance indicators for aggregate production using dynamic simulation," Minerals Engineering, vol. 145, 2020, pp. 1-14 (Year: 2020).
Notice of Allowance and Fees Due (PTOL-85) Mailed on Dec. 17, 2024 for U.S. Appl. No. 17/530,186, 10 page(s).
Notice of Allowance and Fees Due (PTOL-85) Mailed on Jan. 15, 2025 for U.S. Appl. No. 17/530,182, 11 page(s).

\* cited by examiner

FIG. 12C

DEVICE-BASED PRODUCTIVITY SYSTEM

CROSS-REFERENCE TO RELATED APPLICATIONS

The application is a continuation of U.S. Provisional Patent Application No. 63/183,930, titled "Action-Based User Interaction and Notification System, filed on May 4, 2021, which is herein incorporated by reference in its entirety.

This application is also related to the following co-pending U.S. patent applications: application Ser. No. 17/530,182 titled "User Action and Notification System", filed herewith, application Ser. No. 17/530,186 titled "Device-Specific Productivity Enhancements", filed herewith, application Ser. No. 17/530,195 titled "Mobile Device Based Productivity Improvements", filed herewith, application Ser. NO. 17/530,204 "User Interface Modifications for Increased Productivity" filed herewith, all of which are herein incorporated by reference in their entireties.

BACKGROUND

Employee productivity is an integral part of operating and growing a business. However, most employees lack the guidance to be able to determine what are the most impactful tasks they can complete on any given day. As a result, an employee may end up wasting valuable time and resources by performing tasks that are not as beneficial to a company's growth or sustainability, or even the employee's own performance within the company. The employee may also, simultaneously and inadvertently, ignore other more impactful tasks that could have been performed instead that may have helped increase a company's bottom line, increase customer satisfaction, or even improve the employee's own performance within the company.

For example, certain equipment such as machinery, computers, or buildings may require regular maintenance to avoid costly repairs. An employee who may be searching for a task to perform may be unaware that there is equipment that needs to be maintained. However, because the employee is unaware, the employee may inadvertently allocate the company's money and resources to other tasks, leaving the company with costly repairs and reduced productivity because of the poorly maintained equipment.

BRIEF DESCRIPTION OF THE FIGURES

The accompanying drawings are incorporated herein and form a part of the specification.

FIGS. 12A-12C illustrate example screen shots of a big screen user interface, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Employee productivity is an integral part of operating and growing a business. However, most employees lack the guidance to be able to determine what are the most impactful tasks they can complete on any given day. As a result, an employee may end up wasting valuable time and resources by performing tasks that are not as beneficial to a company's growth or sustainability, or even the employee's own performance within the company. The employee may also, simultaneously and inadvertently, ignore other more impactful tasks that could have been performed instead that may have helped increase a company's bottom line, increase customer satisfaction, or even improve the employee's own performance within the company.

For example, certain equipment such as machinery, computers, or buildings may require regular maintenance to avoid costly repairs. An employee who may be searching for a task to perform may be unaware that there is equipment that needs to be maintained. However, because the employee is unaware, the employee may inadvertently allocate the company's money and resources to other tasks, leaving the company with costly repairs and reduced productivity because of the poorly maintained equipment.

Figure 1:
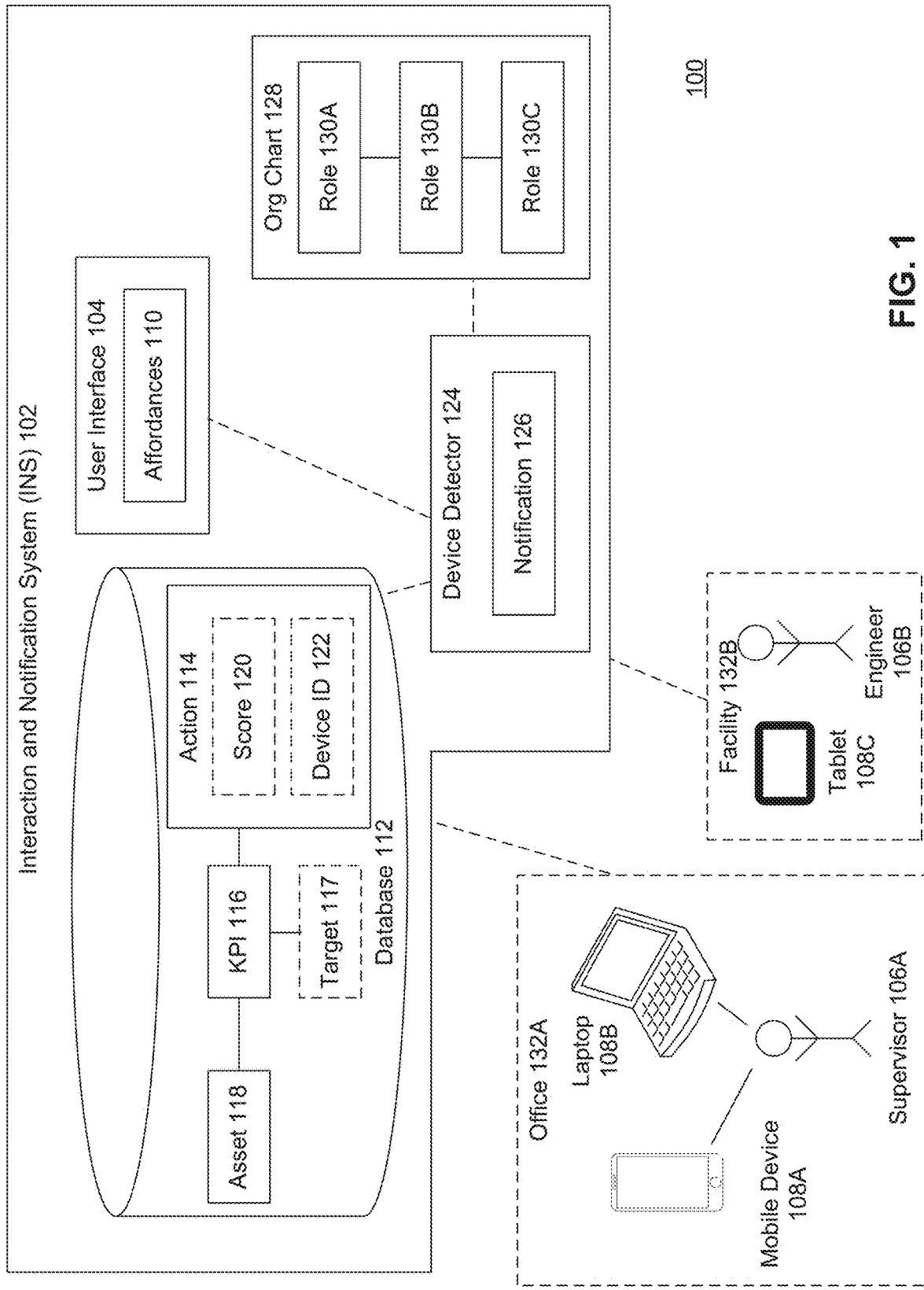
FIG. 1 illustrates a block diagram of an interaction and notification system (INS), according to some example embodiments.

FIG. 1 illustrates a block diagram of an interaction and notification system (INS) 102, according to some example embodiments. In a standard office or working environment, an employee often begins their day by checking their email and then trying to decide what they should work on during that particular workday. If there is no urgent task that needs to be performed, the employee may be left without much guidance in trying to decide which task(s) to perform that day.

However, the deceptively simple act of trying to decide what task(s) to perform on a given day wastes both the employee's time and the company's resources. Further, the employee may end up choosing to perform low priority or low impact tasks when other higher impact tasks could have been performed by the employee instead on that particular day, better utilizing both company resources and the employee's time. As a result, the employee does not perform up to their potential, and the company wastes both computing resources and manpower resources, while more important or impactful tasks, such as properly maintaining company equipment, are left unfulfilled, and the company's profitability decreases, costs (including unnecessary repair costs) increase, or quality of output suffers.

INS 102 may help employees increase both their productivity and the impact of the tasks or actions 114 they perform on any given day. INS 102 may automatically generate and provide actions 114 that a user 106A, 106B (referred to herein generally as "user 106") may select from on any given day. INS 102 may further ensure that a company's equipment (buildings, machinery, vehicles, computers, uniforms, etc.) are properly maintained by alerting a user 106 when a maintenance task is waiting to be performed.

In addition, INS 102 may also provide various data, statistics, or metrics associated with each task or action 114 that helps the user 106 understand the impact of choosing to perform that task or action 114 with regard to how the action 114 impacts the value of one or more key performance indicators (KPIs) 116. The KPIs 116 may be a metric that tracks performance. In an embodiment, KPI 116 may include personal performance KPIs relative to the employee's performance within their role within the organization or as part of a team on a project. The KPIs 116 may also include company KPIs regarding performance, output, brand recognition, building/vehicle/equipment maintenance, etc. With this information available via INS 102, the employee wastes less time trying to decide what tasks to perform and is more likely to choose to perform more actions 114 that maximize the benefit to both the employee and the organization or project.

In an embodiment, INS 102 may generate a user interface 104 that may be used by various users 106A, 106B to manage and perform their duties with respect to their relative roles in an organization. Users 106 may be employees of a company, members of an organization in different roles, or different individuals collaborating on a project or to produce a desired outcome.

In an embodiment, user 106A may be a supervisor of user 106B who may be an engineer, scientist, or technician. The roles of supervisor and engineer as provided in FIG. 1 are exemplary only, and in other embodiments, the roles and their relationships may vary. For example, in another embodiment, the users 106A, 106B may be peers of each other. Or the users 106A, 106B may have complementary supervisory and subordinate roles. For example, user 106A may be managing a first project on which user 106B is participating, and user 106B may be managing a second project on which user 106A is participating.

Each user 106 may log in to their user account on INS 102 (which may be integrated within their organization's enterprise system) from any one of different computing or user devices 108A-C (referred to herein generally as "devices 108"). In the example of FIG. 1, three different devices are illustrated, smart phone or mobile device 108A, laptop 108B, and tablet 108C. In other embodiments, devices 108A-C may include any different computing device including but not limited to a mobile phone, laptop, desktop, server, headset, eyewear, SMART device such as smart television, wearable devices, or any Internet of Things (IOT) device.

The various devices 108 available to users 106 to login to INS 102 may each include different computing, memory, processing, screen size, resolution, or other capabilities. For example, laptop 108B may include greater processing power than tablet 108C, while tablet 108C includes a larger screen than mobile device 108A, while mobile device 108A is more mobile (and thus more likely to be accessible to a user 106) than laptop 108B. Or, for example, mobile device 108A may include one or more apps that are not available on tablet 108C or laptop 108B. In another embodiment, laptop 108B may have access to a mouse for interaction, which may be unavailable via either mobile device 108A or tablet 108C.

These differences in capabilities or functionality of devices 108 may enable the users 106 to perform different tasks depending on from which device 108 the user 106 is using or otherwise has available. In an embodiment, INS 102 may detect the particular device 108 a user 106 is using to login to INS 102 when generating user interface 104 and provide or display actions 114 that the user 106 may perform from the detected device. For example, the user interface 104 may prioritize those actions 114 that are actionable from whatever device 108 the user 106 is currently using to view the user interface 104 over actions 114 that are not actionable from the detected device 108.

In an embodiment, a device detector 124 may detect from which device 108 a user 106 is logging in to access an enterprise system of INS 102. Prioritizing the actions 114, based on device type, via user interface 104 may include changing the display order, font size, font characteristic (e.g., bold, italic, underline), font type, including device specific icons, or simply hiding or not displaying actions 114 that are not actionable from a detected device 108. In another embodiment, the user interface 104 may include a first section for actions 114 that are actionable from the detected device 108, and a second section for actions 114 that are actionable from one or more other devices 108.

In an embodiment, user interface 104 may include one or more affordances 110. The affordances 110 may be user interface objects displayed on user interface 104 with which users 106 may interact. In an embodiment, affordances 110 may allow users 106 to perform various actions with regard to changing what is displayed on user interface 104, including modifying, updating, or selecting new data for display. In an embodiment, affordances 110 may include, but are not limited to, text boxes, check boxes, sliders, radio buttons, drop down menus, selectable icons, radio buttons, drag-and-drop functionality, and interactive maps with zoom in/zoom out functionality.

In an embodiment, the affordances 110 may correspond to or represent information of database 112. Database 112 may be any device or collaboration of devices configured to store and make data available to users 106 via INS 102. Examples of database 112 include, but are not limited to, a relational database, flat file storage, column-oriented database, cloud storage, in memory storage, and/or disk storage.

In an embodiment, the affordances 110 may represent or correspond to action 114, KPI 116, and/or asset 118 information retrieved from or stored in database 112. Action 114 may include actions or tasks that are assigned to or that can be performed by one or more users 106. KPI 116 may be a performance metric that is used to measure the user's performance and/or the performance of the organization, team, or project on which a particular user 106 is working. Different users 106 may see different KPIs 116 and actions 114, even when working in the same organization or on the same project.

In an embodiment, action 114 may be related to KPI 116. For example, action 114 may include a score 120 that changes a value of KPI 116 when the action 114 is performed or marked as completed. Asset 118 may be a physical asset or geographic location that is associated with both the KPI 116 and one or more actions 114. In an embodiment, the action 114 may be performed on the asset 118 directly thus improving a KPI 116, or may be directed to improving a KPI 116 associated with the asset 118. For example, action 114 may indicate that an oil filter needs to be changed in a particular vehicle 118 to improve the maintenance KPI 116 associated with the vehicle.

In an embodiment, a user 106 may be a building supervisor who may view a building efficiency KPI 116, via user interface 104, for a particular Robinson building asset 118. The building efficiency metric may indicate how efficiently (in terms of energy usage) a particular building is operating.

Both the building efficiency KPI 116 and the Robinson building asset 118 may be represented by different affordances 110 within user interface 104. User interface 104 may also include one or more affordances 110 representing a task or action 114 related to the building efficiency KPI 116 and the Robinson building asset 118. For example, action 114 may be "change radiator," which may refer to a radiator (which could be another asset 118) within the Robinson building asset 118 that needs to be changed because it is inefficient, defective, or broken.

In an embodiment, the action 114 may be a one-time or recurring maintenance action for maintaining some company equipment or asset 118. For example, for a company vehicle asset 118, a recurring "change oil" action 114 may be scheduled to appear for a user 106 every 3 months. Missing the change oil action 114, could result in costing the company thousands of dollars extra in engine repair costs. Or, for example, a driver (user 106) may have reported a flat tire, and a one time, "change tire" action 114 may be generated for a mechanic (user 106). Missing this change tire action 114 may cost the company in lost productivity and missed customer deliveries or appointment.

In an embodiment, the building efficiency KPI 116 may be related to the Robinson building as a whole, a particular wing or floor within the Robinson building, or may be a cumulative efficiency measure for multiple buildings within a specific geographic area including the Robinson building. Or, for example, interface 104 may include different KPIs 116 for these different variations of efficiency measurement.

In an embodiment, the action 114 may include or be associated with a score 120. Score 120 may be an indicator of how impactful the action 114 will be in changing the value of a related KPI 116. In an embodiment, the score 120 may be expressed as a numeric or percentage change of a KPI 116, or a new numeric or non-numeric value of KPI 116. For example, KPI 116 for a user's performance may be a letter grade "C". Score 120 for a particular action 114 may indicate the new grade for KPI 116 will be "B" or "+1 one letter grade".

In an embodiment, KPI 116 may include or be associated with a target 117. Target 117 may be a desired value of KPI 116, which may be less or greater than the present value of KPI 116. For example, a sales manager may have a present sales revenue KPI 116 of $118M. However, the target 117 for the sales revenue KPI 118 may be $153M.

When logging in to the user interface 104, the sales manager can see that the current sales revenue KPI 118 is below the target sales revenue 117, and may want to perform one or more actions 114 to close this gap, which may increase both the sales manager's performance and the company's profitability. The score 120 for the actions 114 in this example, may indicate how much the sales revenue is projected to increase (in percentage or dollar value) by performing the various actions 114. This may put the sales manager in an advantageous position when deciding what actions 114 to focus his and/or his team's time and/or resources.

Or for example, a maintenance supervisor can see the healthy score KPIs 118 for various company assets 118 the supervisor is responsible for maintaining. The healthy score KPIs 118 may include a buildings KPI, a vehicles KPI, and a computing equipment KPI. Each KPI 118 may include various actions 114 with various scores 120 which can help the maintenance supervisor determine where to deploy company resources. In an embodiment, score 120 may indicate a potential cost to the company if the action is not performed.

For example, two different vehicles may both include "change oil" actions 114. However, a first vehicle may be 1000 miles beyond its target mileage 117 when its oil was to be changed, while the second vehicle is 500 miles beyond its target mileage 117. The score 120 for the "change oil" action 114 may be "5" while the score 120 for the second vehicle may be "3". From this, the maintenance supervisor may know to prioritize changing the oil on the first vehicle over changing oil on the second vehicle.

In continuing the building efficiency example above, a building manager 106 may see via user interface 104 that the building efficiency KPI 116 for a particular building asset 118 may be 82%, and the target 117 may be 84%. The "change radiator" action 114 may indicate a score 120 of +3%, while a "change water filter" action 114 indicates a score 120 of +1%.

Having this information available via interface 104, may allow the building manager user 106 to make an informed decision on how to prioritize various actions 114 or determine which actions 114 would be most impactful in increasing KPI 116 as indicated by score 120. From user interface 104, the building manager 106 may prioritize changing the radiator over changing the water filter at this time because it has a greater score 120 (i.e., more impact on the KPI 116) and will also increase the KPI 116 beyond the threshold, goal, or target 117.

In an embodiment, action 114 may include or be associated with a device ID 122. Device ID 122 may indicate which device(s) or capabilities may be required to perform the corresponding action 114. In an embodiment, different actions 114 may require particular computing functionality, capabilities, or applications that may be accessible from some devices 108, but not other devices 108. For example, action 114 may be "recompile program." In an embodiment, neither tablet 108C nor mobile device 108A may have the computing power necessary to recompile of the program, and so device ID 122 may indicate laptop, desktop, and server. In another embodiment, device ID 122 may indicate minimum memory or local data storage requirements for a device 108. In an embodiment, device detector 124 may determine whether the detected device satisfies the device ID 122 requirements, such as memory size.

Or for example, device ID 122 may indicate a minimum required screen size to perform the action 114. As such, the action 114 may indicate that the action is only actionable from tablet 108C or laptop 108B, both of which meet the screen size requirements specified by device ID 122. In another embodiment, device ID 122 may indicate that the device 108 the user is using has access to a specified program, app, or application, or has the app previously installed.

As noted above, a device detector 124 may detect from which device 108 a user 106 is logging in to access an enterprise system of INS 102. In an embodiment, INS 102 may compare the device identified or detected by device detector 124 to the device IDs 122 for different actions 114 to determine which action(s) 114 the user 106 logging in from the detected device can perform on the detected device 108. This detection may enable INS 102 to provide a customized user interface 104 prioritizing those actions 114 that can be performed from the detected device 108. This simplifies the decision making by the user 106, when determining which action 114 to perform, by allowing the user 106 to determine which task(s) or actions 114 are actionable from their current device 108.

In an embodiment, if device detector 124 detects that user 106A logs in from mobile device 108A, INS 102 may prioritize those actions that can be performed from mobile device 108A over actions that require functionality of laptop 108B to be performed, as indicated by device ID 122 for the actions 114. In an embodiment, the prioritization may include displaying the mobile device actions 114 and displaying link or other affordance 110 on user interface 104 allowing the user 106 to view actions 114 that are only actionable from other devices 108 (other than the mobile device 108 which was detected). In an embodiment, the affordance 110 may indicate what device may be required or the required capabilities to perform the other device actions 114. For example, user interface 104 may include an affordance indicating for a particular action that the screen size of the mobile device 104 is too small.

In another embodiment, setting the priority of actions 114 based on device type may include making device-detected actions 114 (for which the detected device 108 satisfies a device ID 122) selectable as affordances 110 (that enable a user 106 to see more details about the action 114 and/or mark it as complete from the detected device 108), and display the other non-actionable actions 114 (for which the detected device 108 does not meet the device ID 112 criteria) as plain text, or un-selectable affordances 110.

In an embodiment, user interface 104 may display both device-detected actions 114 and non-actionable actions 114. Then, for example, if a user 106 selects a non-actionable action 114, the user interface 104 may display a notification 126 indicating the currently detected device 108 lacks the capabilities of device ID 122 required to perform the action. Or, for example, the notification 126 may direct the user 106 to login through the laptop 108B or another device 108 that can be used to perform the action 114 and that satisfies the device ID 122.

In another embodiment, INS 102 may also recommend, in response to the non-actionable action 114 selection, a different device-detected action 114 that is actionable that the user 106 could be perform. The different device-detected action 114 may be directed to increasing the same KPI 116 or the same asset 118 as the selected non-actionable action 114. Or, the different device-detected action 114 may be selected because it has a score 120 that is similar to the score of the selected non-actionable action 114.

In an embodiment, after the user selection of the non-actionable action 114, the user interface 104 may change the appearance of the non-actionable action 114 to indicate that the action 114 has been selected and the user has been notified that it is not actionable. For example, the text size may be reduced, the font style may be changed to a different font or italicized, or the action 114 may be hidden or no longer displayed.

In an embodiment, user interface 104 may also distinguish between non-actionable actions 114 and device-detected actions 114 by varying the placement or ordering of the actions 114 (e.g., higher priority or device-detected actions 114 appearing on top or on the right side), font size, font type, color, or including various icons that correspond to the device ID 122 for the actions 114.

In continuing the example above, action 114 may indicate that a program needs to be recompiled. If device detector 124 detects that that user 106 logged in through mobile device 108A, the "recompile program" action 114 may not appear on user interface 104 for the user 106 since the recompile program action 114 cannot be performed from mobile device 108A because it does not satisfy the device ID 122 for the recompile program action 114. In another embodiment, the recompile program action 114 may be appear with a lower priority relative to other items or actions 114 actionable from mobile device 108A, or a visual indicator indicating a laptop or greater computing capacity is required.

In an embodiment, when a first set of actions 114 are actionable from any device 108A-C, and a second, smaller set of actions are only actionable from a specific device 108 with a specific set of capabilities, when device detector 124 detects that the specific device 108 is being used by a user 106, INS 102 may prioritize the second, smaller set of actions over the larger first set of actions 114. For example, if the user 106 logs in from laptop 108B, the recompile program action 114 may be given a higher priority relative to a "send email to client X" action 114 that may be performed from any device 108.

Notification 126 may be an alert, message, email, voicemail, pop-up, or other electronic communication provided to one or more accounts or devices 108 associated with a particular user 106 indicating an action update. The action update may include an indication that an action has been performed by another user 106, an action deadline is coming up, or that a new, urgent, or high priority action 114 has been assigned to the user 106 receiving the notification 126. In another embodiment, the action update may indicate that a target 117 has been changed, or a new KPI 116 value has been calculated (e.g., based on the completion of one or more actions 114).

In an embodiment, the notification 126 may be device specific depending on the device ID 122 of an action 114. For example, user 106A may assign a new action 114 to user 106B to perform. The new action 114 may only be actionable from either tablet 108C or a desktop computer (not shown). The notification 126 of the new action 114 may be sent to the user via email. And when user 108B logs in using tablet 108C, the user 1086B may see the new action 114. However, the notification 126 may not be sent via text message because it not actionable from mobile device 108A.

In another embodiment, when the action is assigned to user 106B, device detector 124 may determine which device(s) 108 user 106B are logged in to INS 102. If, the user 106B has a mobile phone 108A and a tablet 108C, both of which connected to INS 102, the user interface 104 of tablet 108C may display the new action notification 126, while not notification is sent to mobile device 108A.

If the new action 114 is only actionable from the desktop computer. Then notification 126 may be sent to any or all devices 108 with an indication that the new action 114 requires desktop access or capabilities and has been assigned by user 106A to user 106B.

In an embodiment, an organization (org) chart 128 may provide an action and/or notification hierarchy indicating the relationships between the roles 130A-C of different users 106A-B. In an embodiment, INS 102 may use org chart 128 to determine to which accounts, users 106, and/or devices 108 to send notifications 126. The roles 130A-C may indicate a position or responsibility assigned to one or more users 106 within a particular organization, or across different organizations or teams working together on a particular project.

In an embodiment, director (role 130A) may set a target 117 for a fuel economy KPI 116 for a particular vehicle asset 118 as 26.4 miles per gallon (mpg). INS 102 may transmit a notification 126 to supervisor 106A (in role 130B) indicating that a new target 117 has been set by the director for the fuel economy KPI 116. The notification 126 may be transmit to the supervisor's email address, sent via text message, and sent in an automated phone call.

The supervisor 106A may be physically located in an office 132A location. Upon logging in to INS 102 from mobile device 108A, the supervisor 106A may see affordances 110 representing the asset 118, KPI 116, and target 117 for fuel economy. INS 102 may also identify one or more actions 114 that may increase the fuel economy of the target vehicle asset 118, whose current fuel economy KPI is only 22 mpg. The actions 114 may include purchasing and using a fuel additive, which may have an annual cost of $50, or replacing a fuel pump, which may have a one-time cost of $75, both of which may have equal score 120 of increasing the KPI 116 by 5 mpg, thus surpassing target 117.

The vehicle asset 118 may be located in a garage or other remote facility 132B, where engineer 106B works or is located. The supervisor 106A may then assign the action 114 of 'change fuel pump' to any engineer (role 130C) who is located at facility 132B. INS 102 may then transmit a notification 126 to one or more engineers 106B at facility 132B indicating that the fuel pump of the vehicle asset 118 needs to be changed.

When different engineers 106B see the notification 126, they may accept the job, which may cause INS 102 to assign the action to the first engineer who responds 'yes'. A notification 126 may then be transmit to supervisor 106A indicating which engineer 106B to which engineer 106 the change fuel pump action has been assigned.

When the engineer 106B completes the action 114, the engineer 106B may mark it as complete within interface 104 using their tablet 108C. And in addition to receiving the completion indication from engineer 106B, INS 102 may update the KPI 116 of the vehicle asset 118 to indicate 27 mpg, which exceeds the target 117. Further, notifications 126 of the completed job and/or updated KPI 116 may be automatically transmit to both the supervisor 106A in role 130B and the director in role 130A who set the new target 117.

Figure 2A:
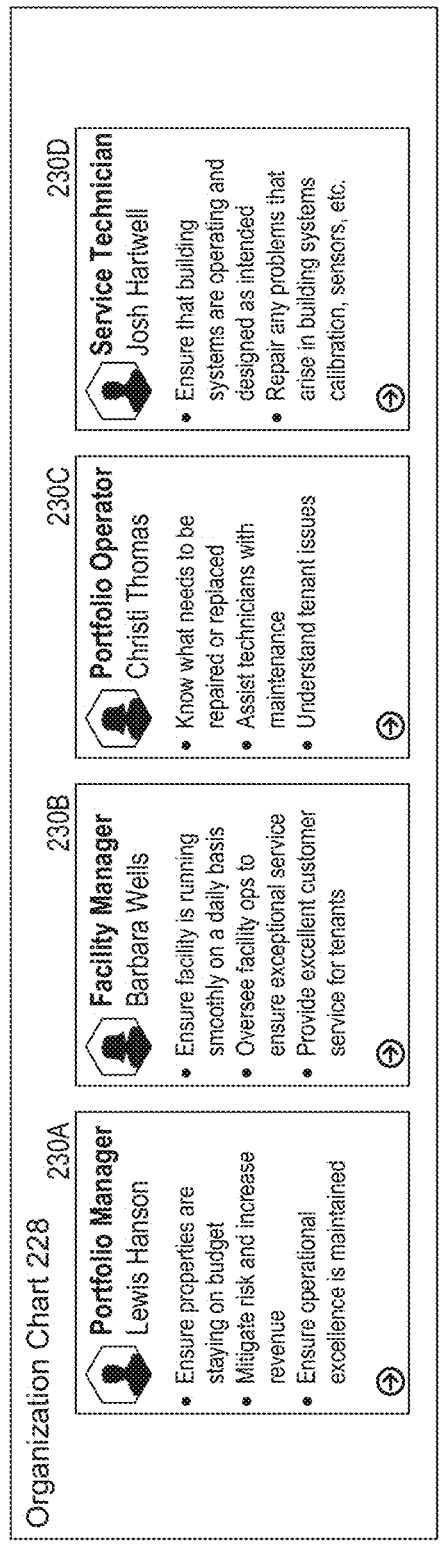
FIG. 2A illustrates an example organization chart with various roles, according to some embodiments.

FIG. 2A illustrates an example organization chart 228 with various roles 230A-D, according to some embodiments. Organization chart 228 may display or track the relationships between and/or responsibilities of different roles 230A-D within a particular organization or on a particular project. In the example illustrated, organization chart 228 includes the roles of portfolio manager 230A, facility manager 230B, portfolio operator 230C, and service technician 230D.

In an embodiment, organization chart 228 may include the names and account or contact information (e.g., user IDs, phone number, email, IP (internet protocol) addresses, MAC (media access control) addresses, home addresses, available devices) of the various users 106 assigned to each role 230A-D.

As illustrated, each role 230A-D may also include a list of responsibilities. The responsibilities may enable INS 102 to match actions 114 with users 106 who may be able to perform those actions. For example, for a change oil filter action 114, INS 102 may be able to identify roles 230 with vehicle maintenance or oil change responsibilities. Or, for example, the assigning or supervisory role may be able to scroll or search to through the responsibilities of different roles or individuals, via user interface 104, to determine to whom to assign the change oil filter action 114.

In an embodiment, organization chart 228 may include which projects each role 230A-D is associated with. In another embodiment, organization chart 228 may include an organization of individuals, whereby each individual may have one or more roles within the organization. In an embodiment, a particular organization may have multiple organization charts 228 based on the organization as a whole, or particular teams or projects the organization is pursuing. In another embodiment, the organization chart 228 may include members across different organizations collaborating on a particular project or goal.

In an embodiment, the organization chart 228 may include a visual or textual indicator of the relationships between the roles 230. Example relationships may include peers, supervisory-subordinate roles, supplier-client roles, teacher-student, etc. For example, the arrows illustrated at the bottom of each role box 230A-D may indicate which role is supervisory to which other role(s).

As illustrated, portfolio manager 230A may be supervisory to the facility manager 230B, facility manager 230B may be supervisory to portfolio operator 230C, and portfolio operator 230C may be supervisory to service technician 230D. In other embodiments, organization chart 228 may be organized in a tree structure or visual arrangement depending on the relationships between the roles 230A-D.

Figure 2B:
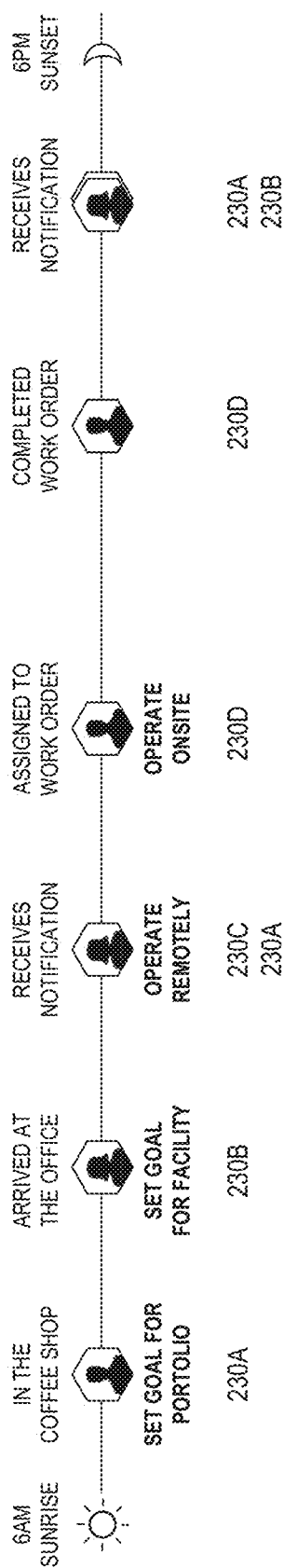
FIG. 2B is a block diagram illustrating an example of how INS may facilitate communications and actions between the various roles based on the organization chart, according to some embodiments.

FIG. 2B is a block diagram 240 illustrating an example of how INS 102 may facilitate communications and actions between the various roles 230A-D based on the organization chart 228, according to some embodiments.

For example, the portfolio manager 230A may set a goal for the portfolio through user interface 104 of INS 102. The goal may be to set a new target 117 by increasing a KPI 116 of a specific building 118. INS 102 may determine from organization chart 228 that the facility manager 230B is responsible for this specific KPI 116 and/or building 118. INS 102 may then send a message, alert, or notification 126 to the account or device(s) of the facility manager 230B.

When the facility manager 230B logs in from their device 108, they may see a new action 114 regarding the new target 117 set by the portfolio manager 230A. The facility manager 230B may then set a goal for the facility or building 118 through user interface 102.

INS 102 may receive the facility goal responsive to the notification 126 and may send messages or notifications 126 to both the supervisory account of the facility manager 230B who assigned the goal (e.g., the portfolio manager 230A), and the user or role responsible for the building 118 with which the goal is associated, the portfolio operator 230C.

Through INS 102, the portfolio manager 230A may be able to see a history of actions 114 taken or assigned to different users 106 with regard to a particular KPI 116, target 117, and/or asset 118. For example, the portfolio manager 230A may see, via user interface 104, that the facility manager 230B took action or performed a task relative to the new target 117. The portfolio operator 230C may see a new action 114 regarding the identified building 118.

The portfolio operator 230C may then create a work order (action 114) based on the facility or building 118 goal and assign the work order to a service technician 230D through user interface 104. INS 102 may send a notification 126 to one or more service technicians 230D at the building. The responding service technician 230D may be responsible for fulfilling or completing the work order.

When the service technician 230D completes the work order, he may indicate as such in user interface 104. INS 102 may then calculate a new KPI 116 based on the score 120 of the action 114 associated with the work order, and communicate its completion to one or more supervisory accounts, including the accounts of both the portfolio manager 230A and facility manager 230B. Then, for example, the portfolio manager 230A will see the new updated KPI 116 for the building 118 based on the score 120 for the completed action 114. In an embodiment, the service technician 230D may transfer or reassign the work order to another service technician or employee, and notifications 126 may be sent to one or more supervisory accounts or roles.

Figure 3A:
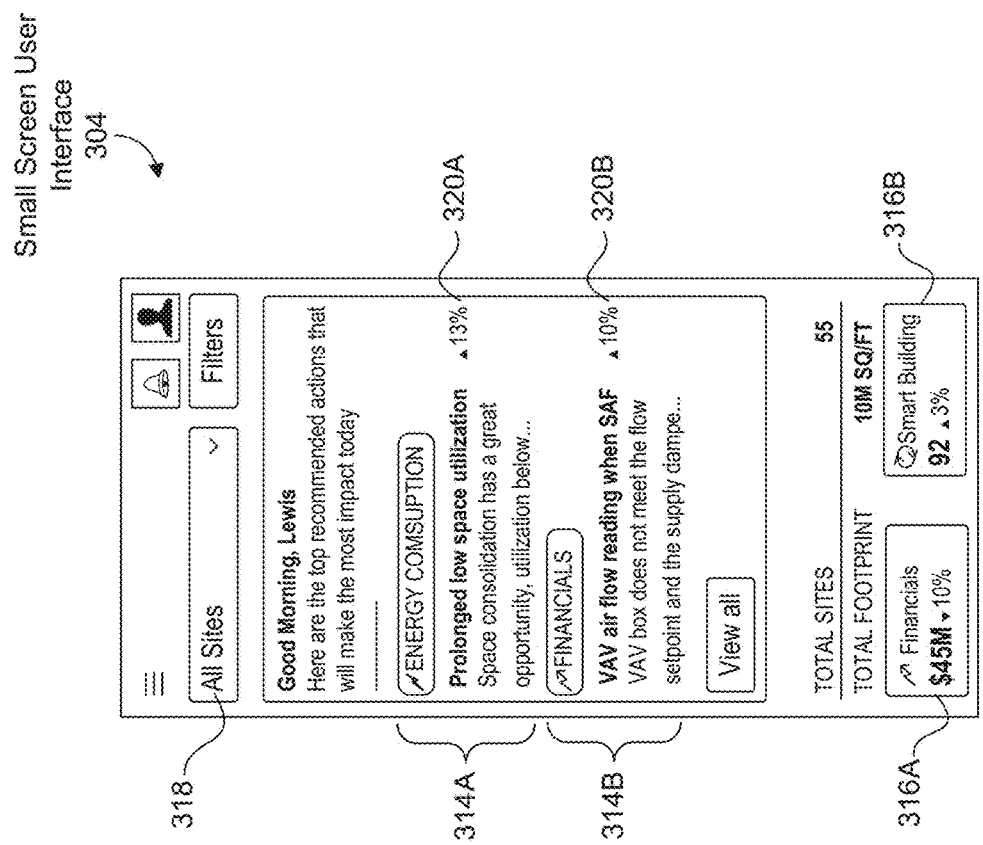
FIG. 3A illustrates an example small screen user interface, according to some embodiments.

FIG. 3A illustrates an example small screen user interface 304, according to some embodiments. In an embodiment, a user 106 may receive a notification 126 on the locked screen of their mobile device 108A. The notification 126 may indicate that there is an action 114 assigned to the user 106 that needs to be completed by user 106. In an embodiment, the notification 126 may indicate from which device 108B, 108C the action 114 is to be performed if the action 114 is not actionable from the device 108A to which the notification 126 was provided. The action 114 may be a high priority action, a recently assigned action, an action with an upcoming deadline or due date, or an a reminder set by the user 106.

In an embodiment, user 106 may log in to INS 102 using mobile device 108A, and INS 102 may display the small screen user interface 304 (e.g., as a device customized version of user interface 104). As referenced above, INS 102 may configure the user interface 104 depending on which device 108A-C is detected by device detector 124. Device detector 124 may determine or categorize the screen size of a detected device 108 as being either small or big. INS 102 may then customize user interface 104 accordingly.

As illustrated, small screen user interface 304 may include various modifiable or interaction based affordances 110. For example, affordance 318 indicates of what assets 118 are being displayed. As illustrated, all assets may be displayed. However in another embodiment, the user 106 may select the affordance 318 and select a specific building, device, vehicle, geographic area, or other asset 118 to display. A new asset selection through affordance 318 may cause the rest of the small screen user interface 304 to be updated as well.

Small screen user interface 304 may include affordances 314A, 314B representing list actions 114 in descending order based on their relative scores 320A, 320B. The scores 320A, 320B may indicate a change in a KPI 116 which may be specific to a user, asset, team, project, or the organization as a whole. Displaying the scores 320A, 320B may enable the user 106A to prioritize which actions 314A, 314B to perform. The user may also select the 'view all' button to see more actions 114.

In an embodiment, the actions 314A, 314B may be selected to be displayed based on their correspondence to a displayed KPI affordance 316A, 316B, selected asset 318, the identity of the user 106 ("Lewis"), and/or the detected device 108. For example, both actions 314A and 314B may both be actionable by the user 106 from the detected device 108.

As just referenced, small screen user interface 304 may also include various affordances 316A, 316B representing different KPIs 116 which are impacted by the displayed actions 314A, 314B. For example, performing action 314B may cause a 10% increase (320B) to the financials KPI 316A.

Figure 3B:
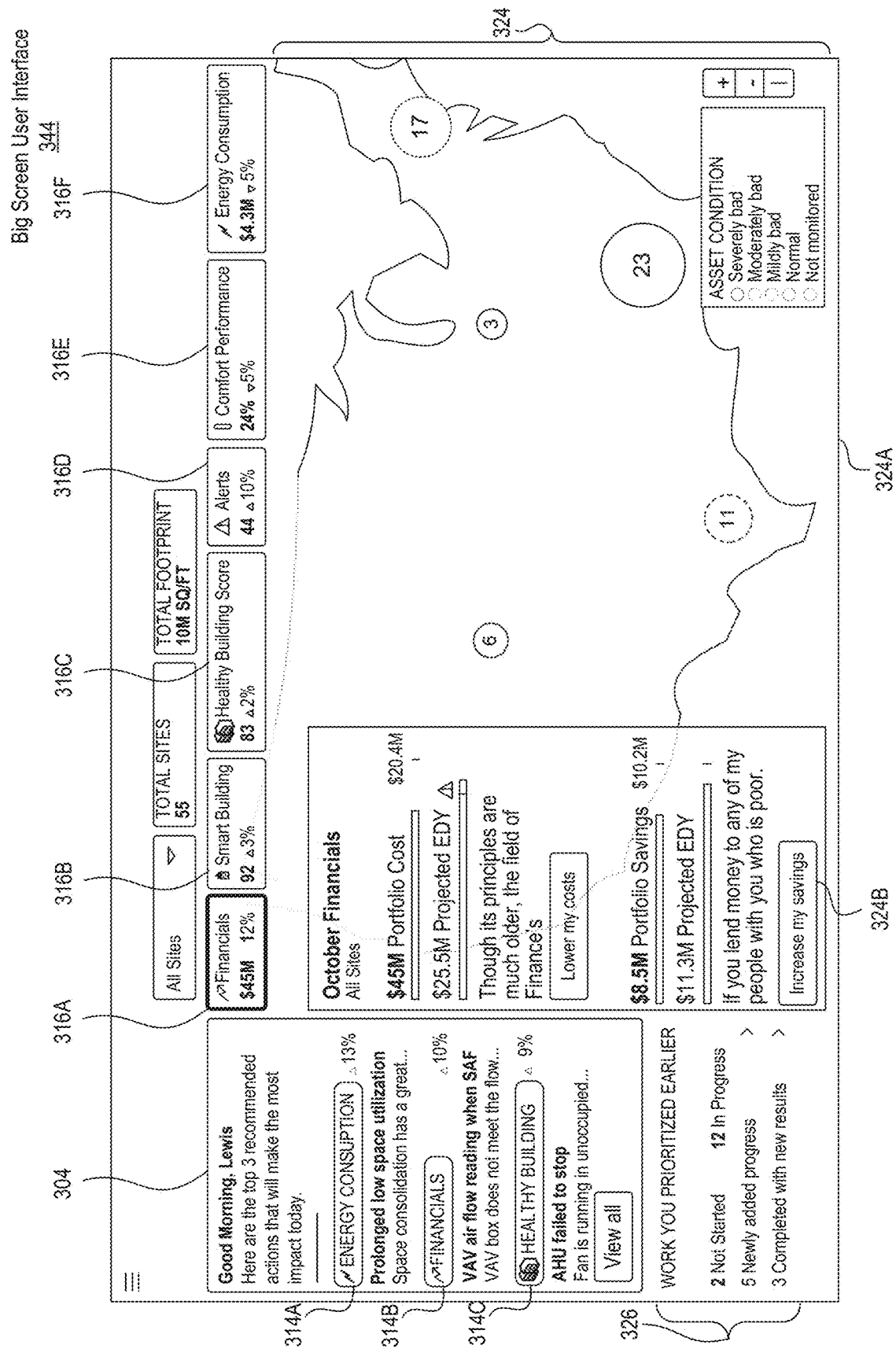
FIG. 3B illustrates an example big screen user interface, according to some embodiments.

FIG. 3B illustrates an example big screen user interface 344, according to some embodiments. As noted above, in an embodiment, a user 106 may receive a notification 126 on the locked screen of mobile device 108A. The notification 126 may indicate that there is a new action 114 assigned to the user that can only be completed on a laptop or desktop computer with the required memory, processing capabilities, and/or screen size. As such, rather than logging in to INS 102 through their mobile device 108A, user 106 may log in using laptop 108B and may be presented with big screen user interface 344.

Because of the larger display area, big screen user interface 344 as viewed on laptop 108B may include more information than small screen user interface 304 as viewed on mobile device 108A. As illustrated, the same information provided in the small screen user interface 304 may be included within the big screen user interface 344. However big screen user interface 344 may also include additional affordances, information, and/or functionality beyond what was provided on the small screen user interface 304.

For example, small screen user interface 304 may include affordances 316A, 316B representing a set of KPIs 116, but big screen user interface 344 may include or display additional affordances 316C-F representing additional KPIs 116. Big screen user interface 344 may also include a data section with additional affordances 324. The data section 324 may include any data relevant to KPIs 316A-316F and/or actions 314A-C.

In an example embodiment, the data section 324 may be sub divided into a map section 324A and an additional details section 324B. The map section 324A may include various affordances (as represented by circles) that represent various selectable assets 118. As illustrated, a key or legend may provide a high level view of an asset condition. In an embodiment, the asset condition may correspond to whether one or more KPIs 116 of the asset 118 are below, meeting, or exceeding their targets 117. This may give a user 106 a quick way to determine what assets 118 may need the most attention (e.g., where to focus their time, resources) in terms of actions 114. The numbers inside the circles may indicate the number of company assets 118 located within a particular geographic region.

Additional data section 324B may provide additional details regarding the selected KPI 316A (as indicated by the bold outline). Section 326 may provide the user 106 with a personal history regarding actions 114 that have been assigned to them or that they assigned to others for a modifiable time period. Example time periods include the previous week, month, year, fiscal quarter, etc. Or, for example, section 326 may provide details for pending or outstanding actions 114 waiting to be completed.

In an embodiment, if a user 106 selects, modifies, or updates one of the displayed affordances, INS 102 may update at least a subset of the other displayed affordances. For example, a selection of a different KPI 316B-F may cause INS 102 to retrieve new data and/or update the actions 114A-C and the additional data section 324B. The new actions 114A-C may correspond to the newly selected affordance for the KPIs 316B-F.

Or, for example, a user 106 may select one of the circle affordances on the map 324A, and may cause INS 102 to update the KPIs 316A-F based on the selected geographic area or asset 118. INS 102 may also update the actions 314A-C to correspond to one of the updated KPIs 316A-F.

INS 102 may display information through the various affordances and provide users 106 different perspectives on how to view data and make decisions, enabling them to maximize their time and resources, thus helping each user 106 have their most productive day every day.

Figure 4A:
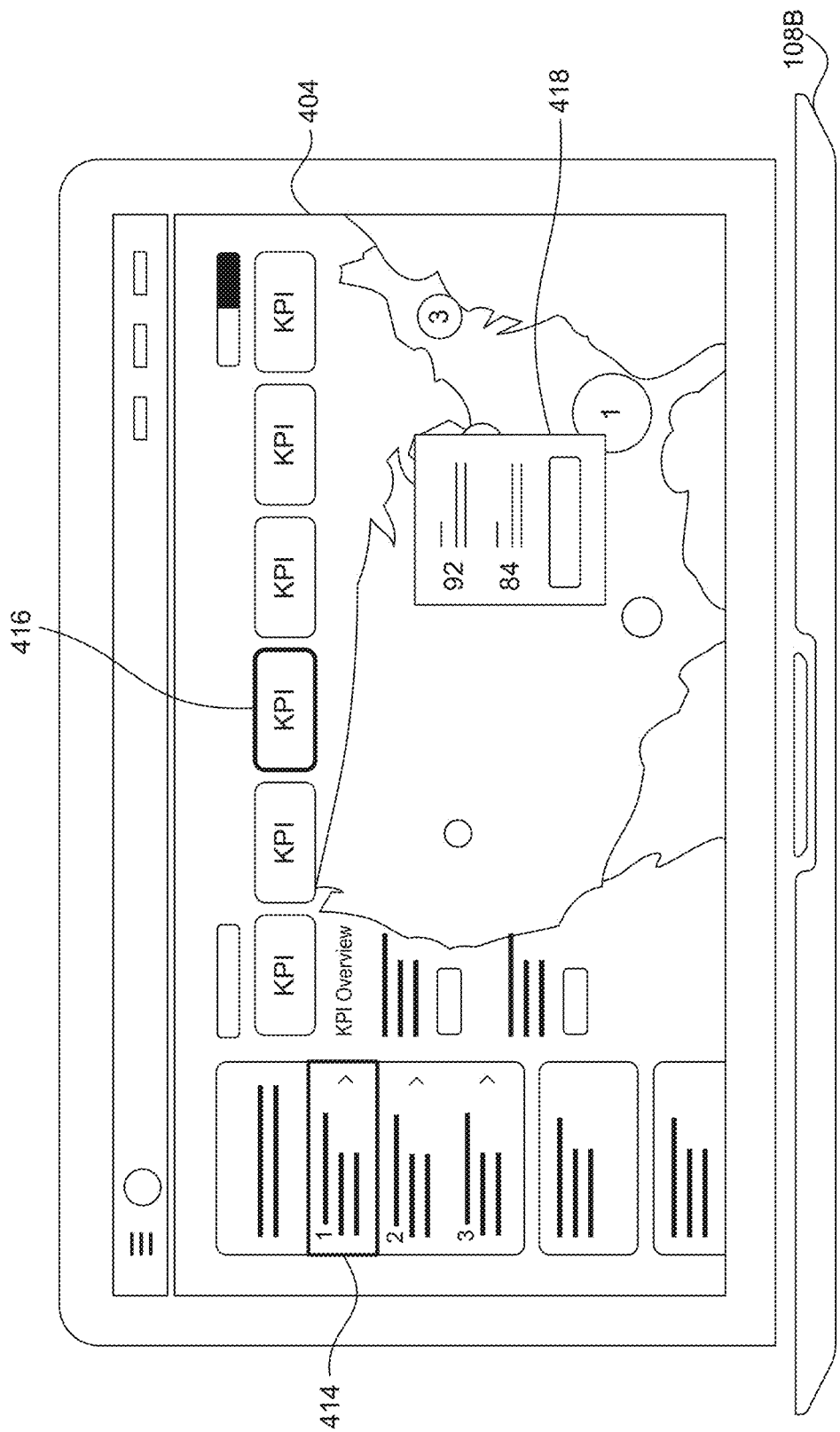
FIG. 4A illustrates another example big screen user interface, according to some embodiments.

FIG. 4A illustrates another example big screen user interface 404, according to some embodiments. As illustrated, the user interface 404 may be displayed on a laptop 108B, or other computing device connected to a screen large enough to display the provided information. In an embodiment, device detector 124 may detect or categorize the screen size of a device 108A-C being used to access INS 102 and configure the corresponding user interface 102 accordingly. For example, from detecting the make and model of a particular device 108, device detector 124 may be able to determine the screen size for that make and model device 108.

In the example illustrated, a user 106 may have selected a particular action 414 from the actions panel. INS 102 may automatically highlight the corresponding KPI 416 and geographic region or asset 418. For example, performing action 414 on asset 418 may cause the value of KPI 416 to change by a score (130) associated with the action 414. The user interface 404 may also include an overview of the selected KPI 416.

In another embodiment, a user 106 may have selected the KPI 416, and INS 102 may automatically highlight or emphasize the one or more actions 414 that that increase a value of the KPI 416. INS 102 may also highlight the one or more assets 418 corresponding to the KPI 416 and/or actions 414. If multiple actions may change the value of the selected KPI 416, INS 102 may color code each action based on its score 120, or select the action 414 with the highest score (e.g., greatest impact) on the selected KPI 416.

The box on the map associated with selected asset 418 may include additional information regarding the selected asset 418. For example, the box may provide a current value or score of asset-specific KPIs 116. The box may include any information about the selected asset 418 which may be beneficial to user, including the performance of a device. For example, the box may include air compressor readings of an air compressor in a garage taken at different moments in time. Thus the user 106 can quickly see how the performance of the air compressor has changed over time. Or, for example, the box may include other actions that were recently performed or scheduled to be performed on the selected asset 418.

Figure 4B:
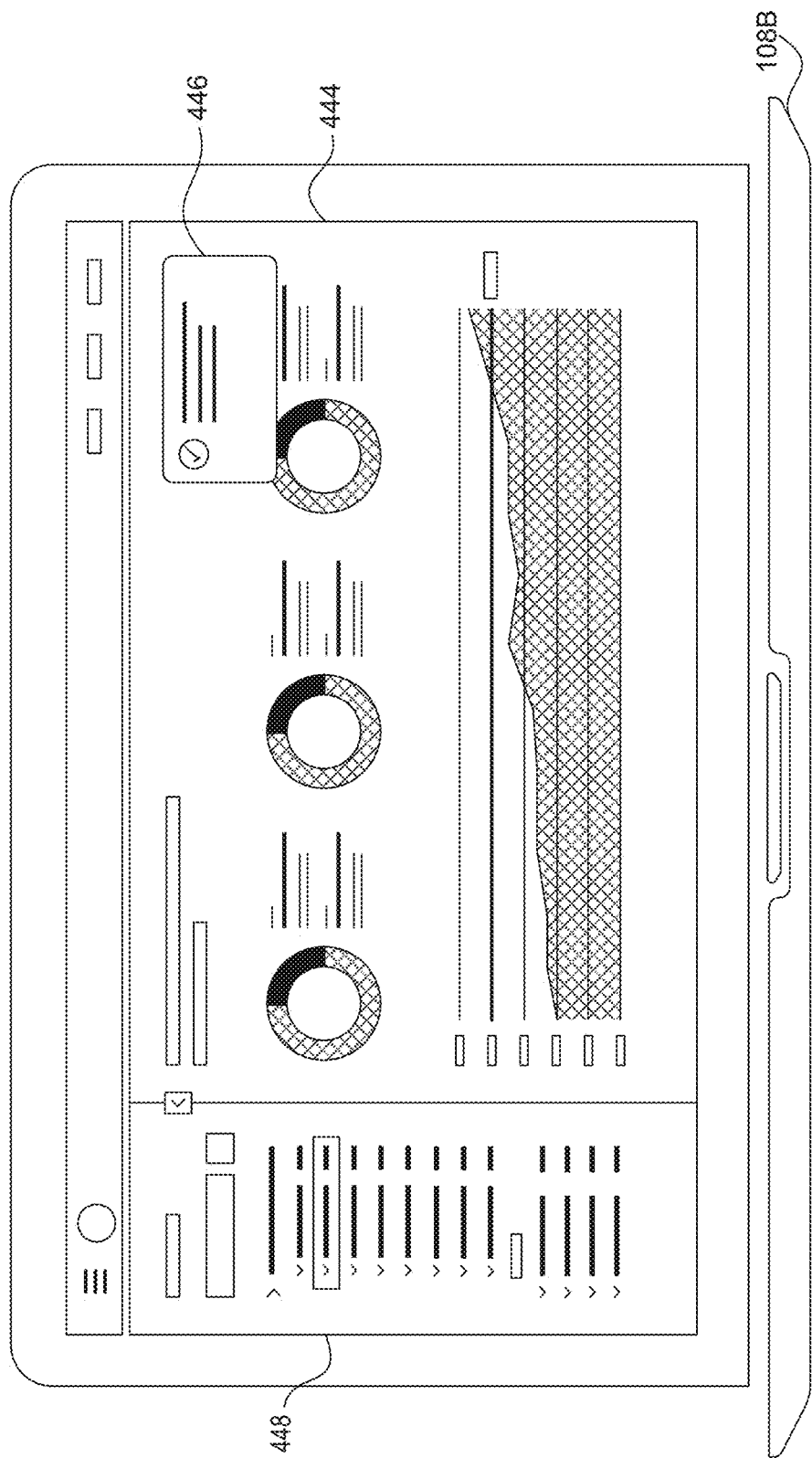
FIG. 4B illustrates an example user interface, according to some embodiments.

FIG. 4B illustrates an example user interface 444, according to some embodiments. User interface 444 provides an example of additional information that may be provided by INS 102 about a selected geographic area or building (asset 418 of FIG. 4A).

INS 102 may retrieve additional data from database 112 about the selected geographic region or asset 418. For example, each of the three circles may provide the status of three different functional units or asset 118 ((e.g., generators, fans, AC units, heaters, etc.) located in the same building asset 118. Or for example, each circle may represent data about a specific asset 118 or functional unit (such as a fan) across three different time periods. The graph at the bottom may include a performance metric about the asset 118 and may include a danger, warning, or capacity line.

Section 448 may include actions 114 that have been and/or may be performed with regard to one or more of the assets 118 about which information is displayed in user interface 444. In the example illustrated, the user 106 may have selected a particular action 114 from section 448 and mark the action as complete in box 446. Box 446 may enable the user 106 may indicate that the action has been completed, and provide any notes, details, costs, etc. about the action. INS 102 may receive the completion indication from box 446 and update the related KPI(s) 116 based on the score 120 of the completed action 114. INS 102 may then provide notifications 126 to any other users 106 associated with the asset, KPI, or user performing the action 114.

Figure 12A:
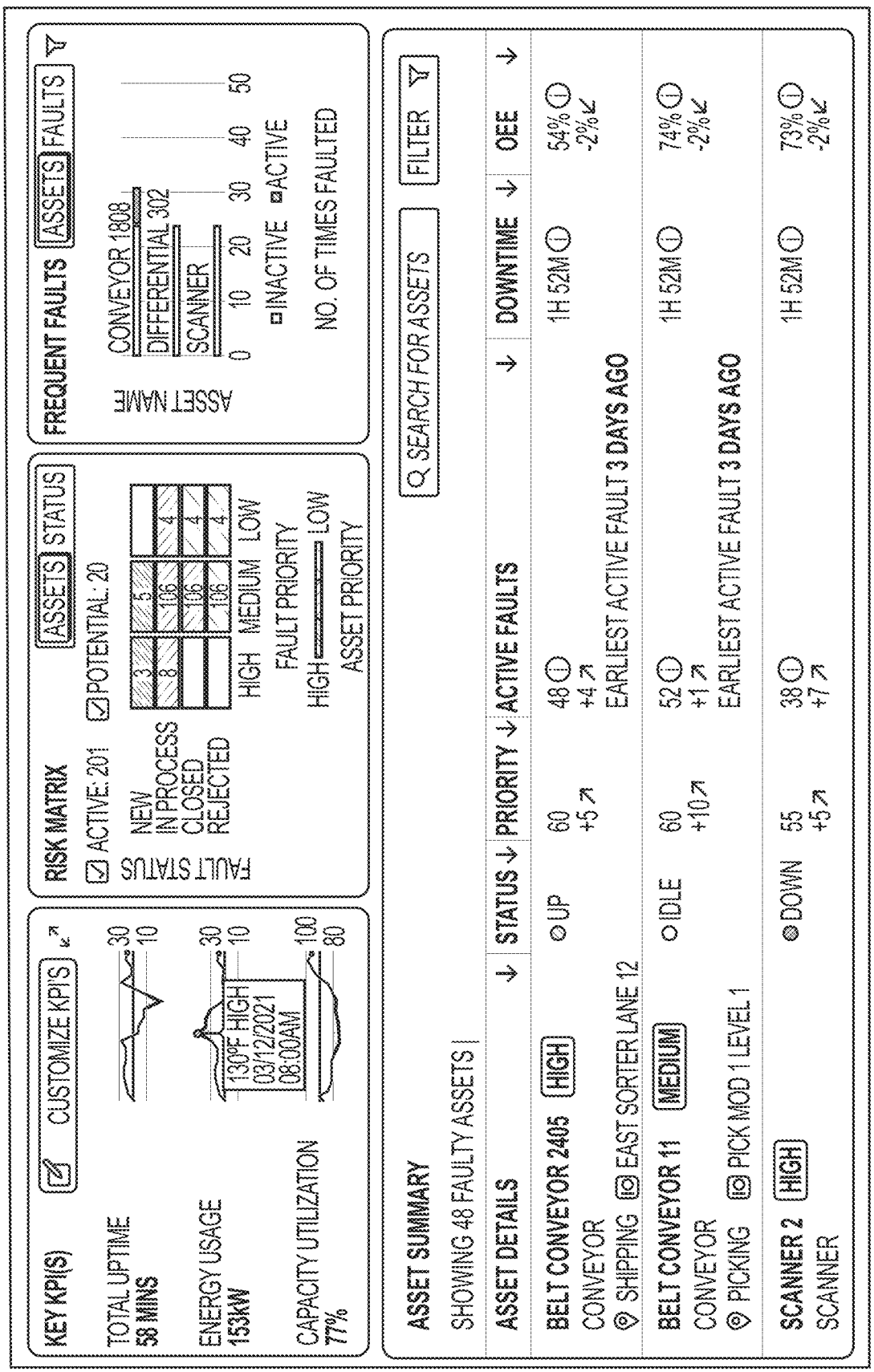
Figure 12B:
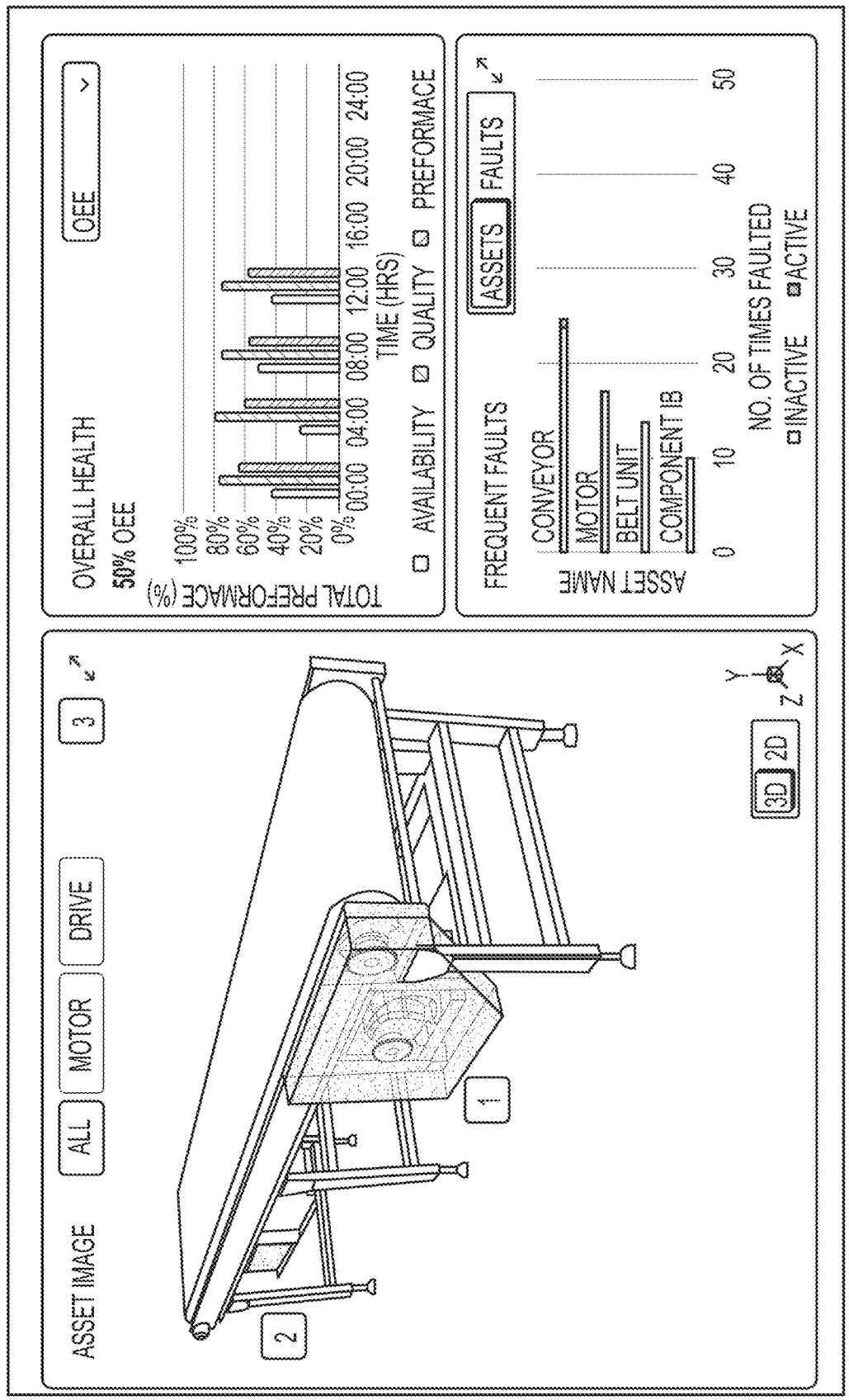
Figure 12C:
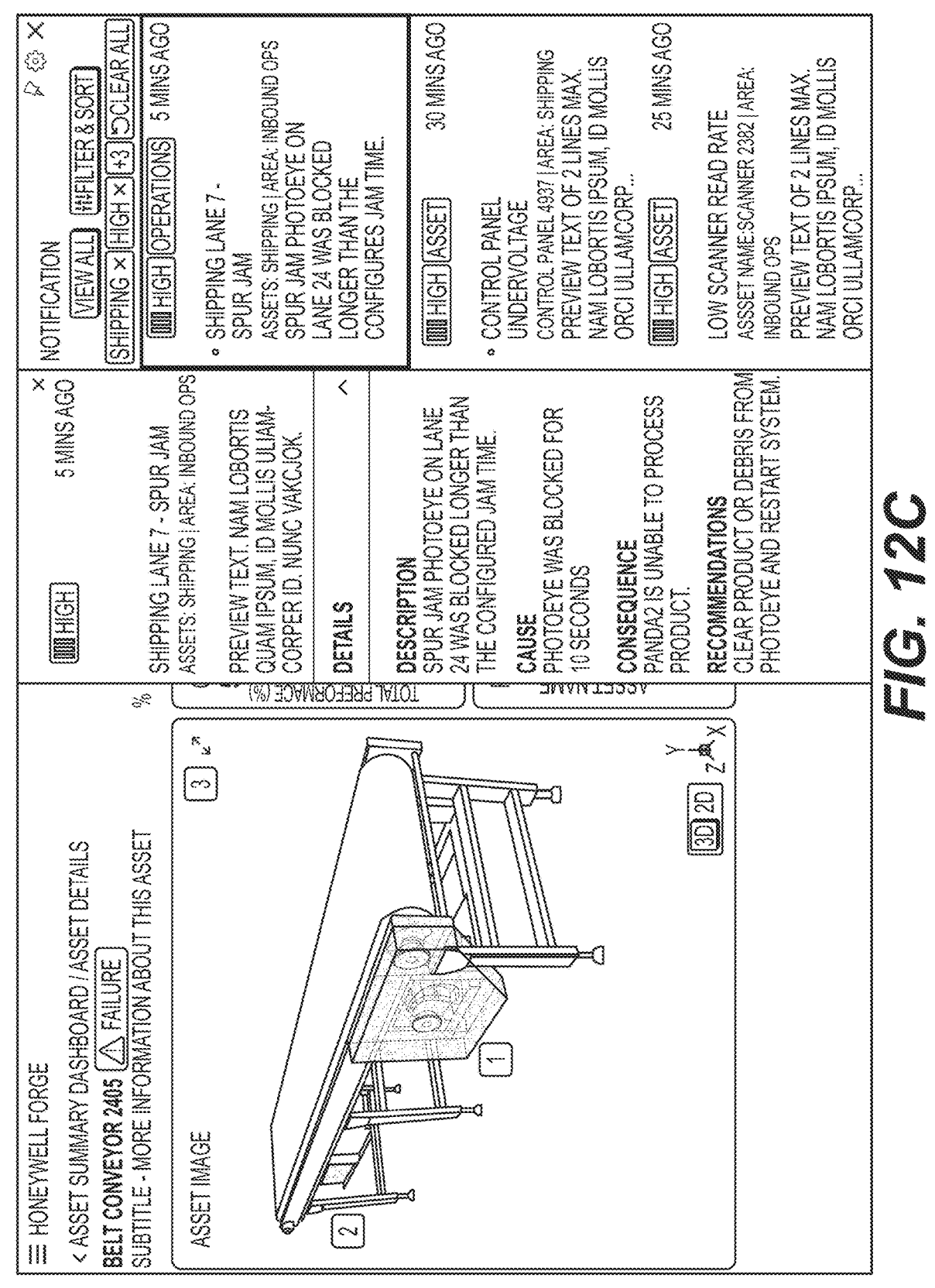

FIGS. 12A-12C illustrate example screen shots of a big screen user interface, according to some embodiments. In FIG. 12A, a user may be notified or alerted to the energy usage having exceeded a particular energy usage threshold. From FIG. 12A, the user may see that Belt Conveyor 2405 is the highest scored or priority issue, and the user may select Belt Conveyor 2405 from the asset list. This may bring up FIG. 12B in which more details about the selected asset (Belt Conveyor 2405) are displayed. The screen indicates that the asset is in a failure state.

Item 1 on the conveyor diagram may correspond to the highest priority action item, the shipping lane spur jam. Clicking on the action item, may produce the interface of FIG. 12C which provides the user even more details about the problem, and may even include recommendations on how to fix or resolve the problem.

Figure 5:
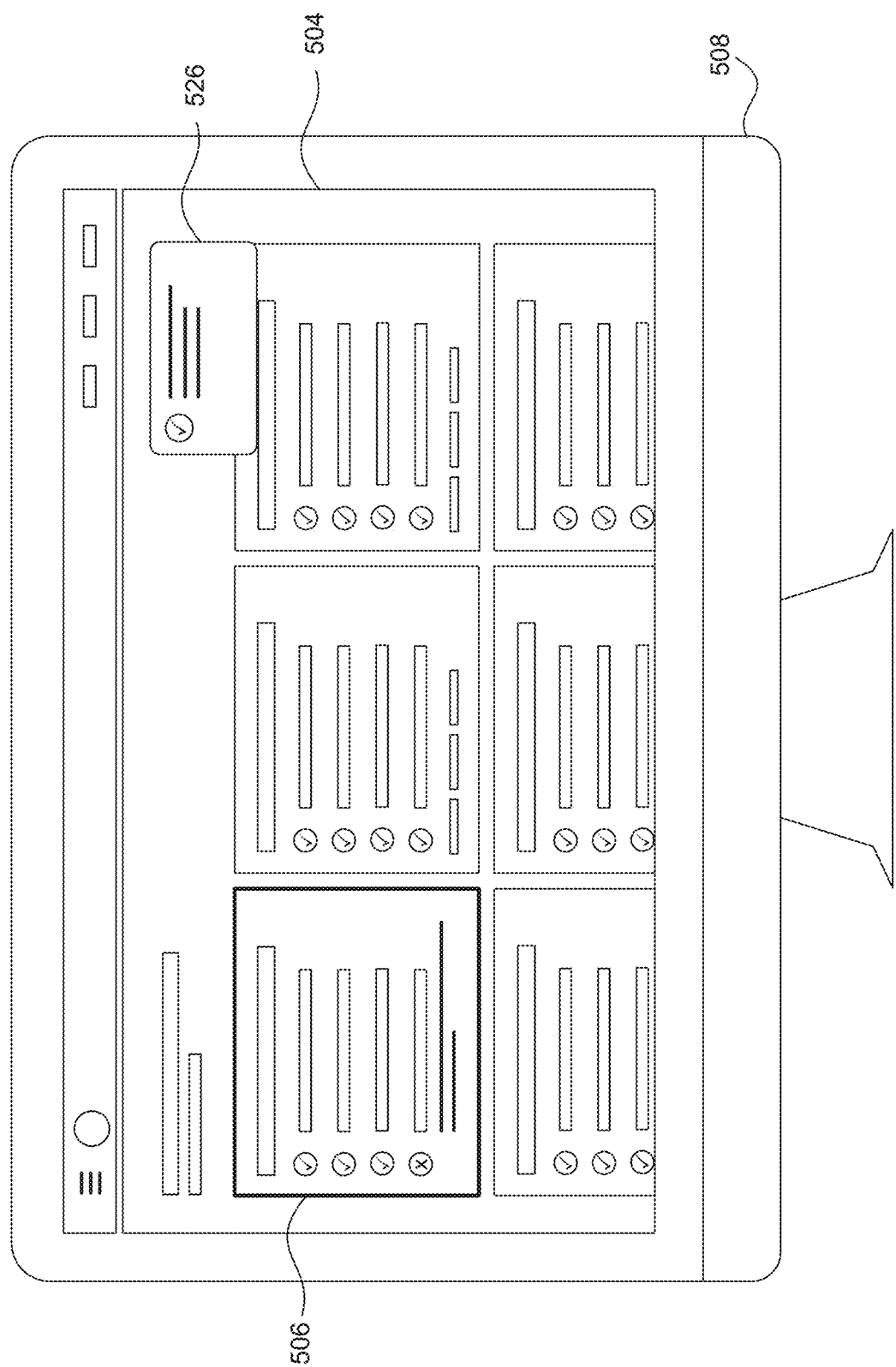
FIG. 5 illustrates an example user interface, according to some embodiments.

FIG. 5 illustrates an example user interface 504, according to some embodiments. As illustrated, the user interface 504 may be displayed on a SMART TV or desktop computer, or other computing device connected to a monitor or screen large enough to display the provided information.

In the user interface 504, a user 106 may view a history of actions 114 taken by one or more users 106 across one or more users 106, projects, assets 118, and/or KPIs 116. The check marks may indicate successfully completed actions 114, and the X may indicate an action that was unsuccessful or has not yet been completed.

In an embodiment, a user 106 may receive a pop up notification 526 that a new action 114 has been completed (which may not be reflected in the action history yet). In another embodiment, notification 526 may provide additional details, such as completion details, about a selected one or more actions from the highlighted action history box 506.

Figure 6:
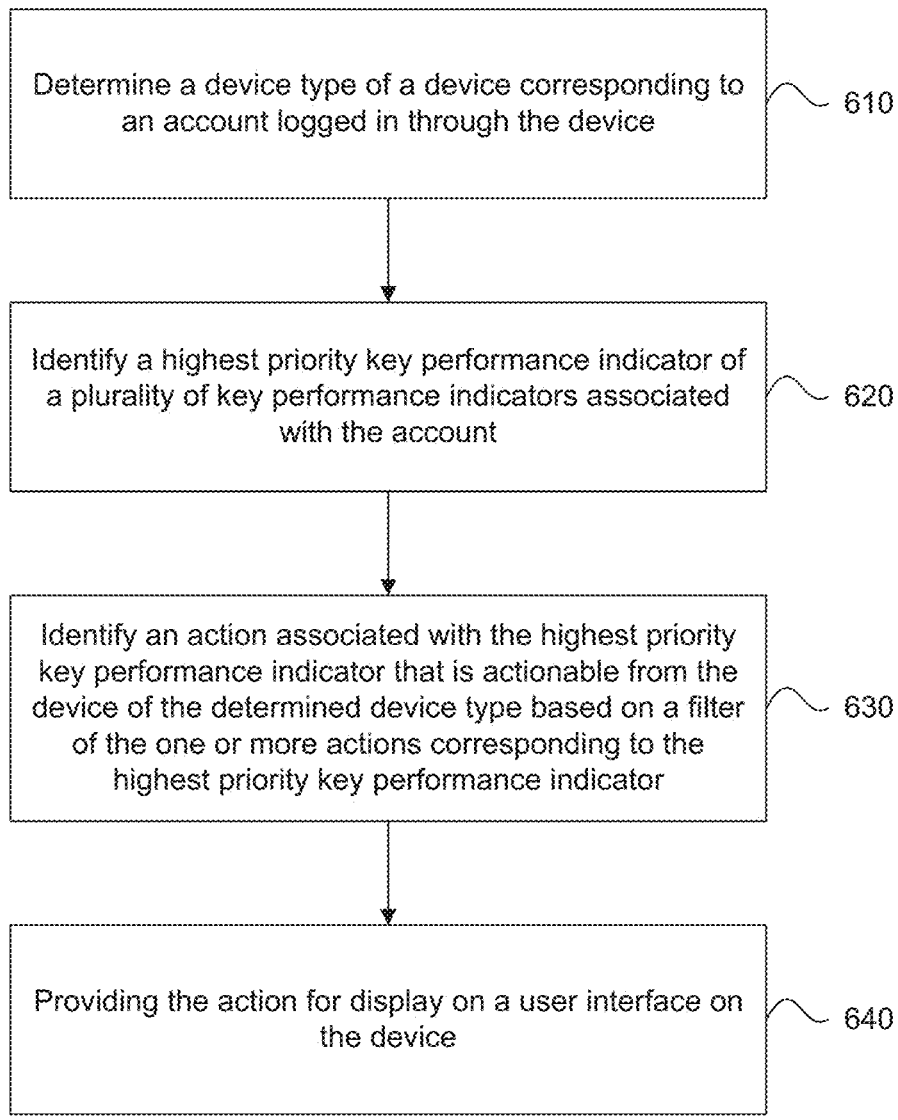
FIG. 6 is a flowchart illustrating example operations for displaying actions in a user interface based on key performance indicators, according to some embodiments.

FIG. 6 is a flowchart 600 illustrating example operations for displaying actions in a user interface based on key performance indicators, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Without limiting method 600, method 600 is described with reference to elements in FIG. 1.

At 610, a device type of a device corresponding to an account logged in through the device is determined. For example, device detector 124 may identify or detect from which type of device a user 106 is accessing INS 102. The devices may include a mobile device 108A, laptop 108B, tablet 108C, or any other computing or IoT device. In an embodiment, each device 108 may be associated with a set of capabilities that INS 102 uses to customize an interface 104. Example capabilities include screen size, memory, processor speed, bandwidth, etc.

At 620, a highest priority key performance indicator of a plurality of key performance indicators associated with the account is identified. For example, a supervisor 106A may login to their account, and INS 102 may identify a set of KPIs 116 associated with the supervisor 106A account. For example, the role of supervisor 106A may be associated with a set of metrics that are used to determine how well the supervisor 106A is performing within the context of an organization or project.

These metrics or KPIs 116 may be based on a user's role, day of month, the current fiscal quarter, etc. Each KPI 116 may include one or more actions 114 with scores 130 that increase a value of one or more of the respective KPIs 116 when completed. Example actions 114 include assigning actions 114 to other people, preparing project outlines, timelines or budgets, answering questions or responding to emails, publishing papers, etc.

In an embodiment, INS 102 may compute a variance between KPIs 116 and targets 117, and assign priorities to the KPIs 116 based on the variances. For example, the largest variance may be assigned the highest priority. Or, for example, the user 106 may set the priority of the KPIs 116.

At 630, an action associated with the highest priority key performance indicator that is actionable from the device of the determined device type is identified based on a filter of the one or more actions corresponding to the highest priority key performance indicator. For example, device detector 124 may determine whether supervisor 106A is logged in from mobile device 108A or laptop 108B.

INS 102 may adjust the user interface 104 based on the detected device. For example, INS 102 may either present a small screen user interface 304 or a big screen user interface 344 based on a screen size of the detected device. Further, certain actions 114 may only be actionable from devices with certain computing or other capabilities.

Thus, if device detector 12 detects that the supervisor 106A is logged in to laptop 108B, the laptop only actions may be provided first or with higher priority than actions that can be performed on either laptop 108B or mobile device 108A. Similarly, if device detector 12 detects that the supervisor 106A is logged in to mobile device 108A, the mobile device only actions may be provided first or with higher priority than actions that can be performed on either laptop 108B or mobile device 108A.

At 640, the action is provided for display on a user interface on the device. For example, when logging in to INS 102, the supervisor 106A may be presented with actions 114 that are configured specifically for the supervisor 106A. The actions 114 may be sorted or presented based on a highest value KPI 116 (where different KPIs have a different impact on an overall score or performance of the supervisor 106A), a highest score 120 in terms of the impact of the action 114 on one or more of the KPIs 116, and/or the type of device 108 the supervisor 106A is detected as being logged in from.

Figure 7:
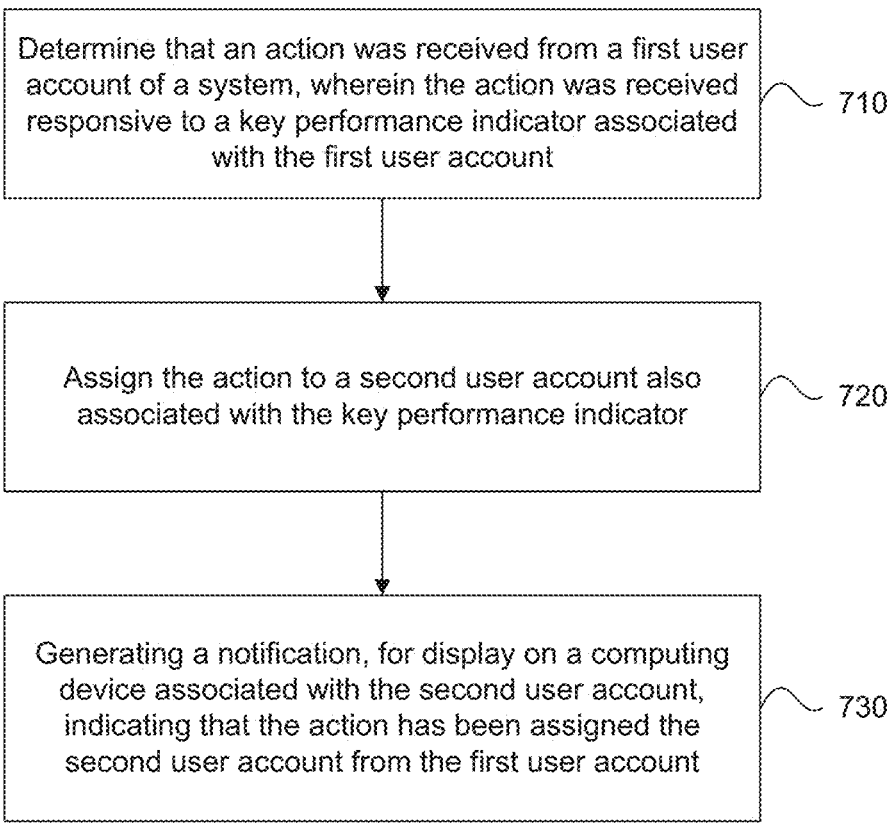
FIG. 7 is a flowchart illustrating example operations for providing notifications to a user that has been assigned to the user, according to some embodiments.

FIG. 7 is a flowchart 700 illustrating example operations for providing notifications to a user that has been assigned to the user, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Without limiting method 700, method 700 is described with reference to elements in FIG. 1.

At 710, it is determined that an action was received from a first user account of a system. For example, INS 102 may receive an action 114 from a supervisor 106A. The action 114 may have been received responsive to determination that a particular KPI 116 is below a desired threshold 117.

At 720, the action is assigned to a second user account also associated with the key performance indicator. For example, INS 106 may determine from organization chart 128 that role 130B of an engineer 106B is responsible for performing the action 114 input by supervisor 106A. INS 106 may then assign the action 114 to an account of engineer 106B, and may send a notification 126 to supervisor 106A indicating to whom the action 114 was assigned.

At 730, a notification is generated for display on a computing device associated with the second user account indicating that the action has been assigned the second user account from the first user account. For example, INS 126 may generate a notification 126 which is transmit to the mobile phone number, email address, chat or social media handle, or other account of engineer 106B. The notification 126 may inform engineer 106B of the new action 114 that has been assigned to engineer 106B.

Figure 8:
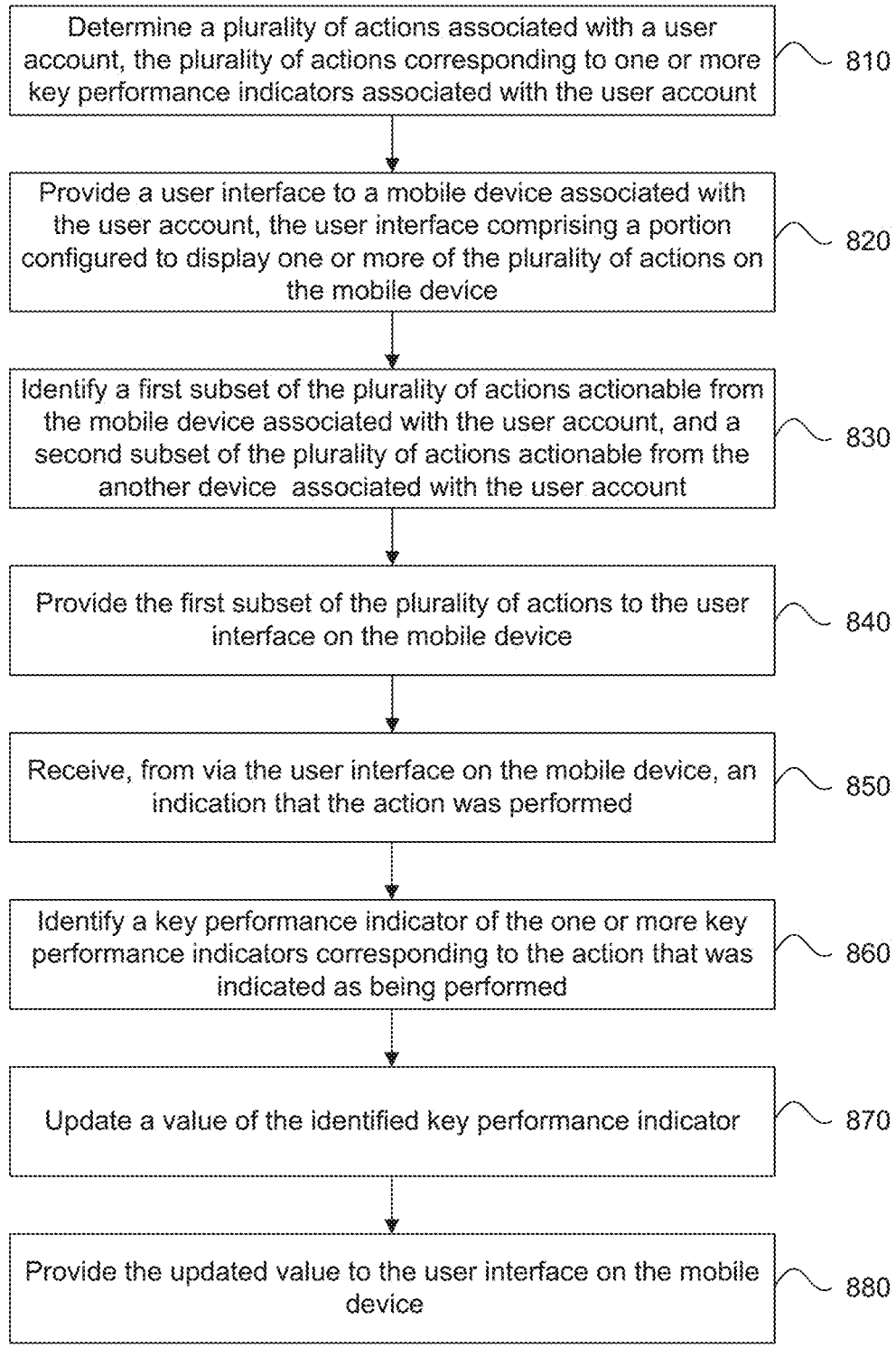
FIG. 8 is a flowchart illustrating example operations for providing a notification to a mobile device for those actions that can be performed using the mobile device, according to some embodiments.

FIG. 8 is a flowchart 800 illustrating example operations for providing a notification to a mobile device for those actions that can be performed using the mobile device, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Without limiting method 800, method 800 is described with reference to elements in FIG. 1.

At 810, a plurality of actions associated with a user account are determined, the plurality of actions corresponding to one or more key performance indicators associated with the user account. For example, INS 102 may determine different actions 114 that are associated with an account for supervisor 106A. The actions 114 may include, for example, performing a task, assigning a task, creating a report, changing a filter, etc. Each of the actions 114 may include a score 120 that indicates the impact of performing or completing the action 114 on a KPI 116. The KPI 116 may be any personal performance or asset performance metric, such as efficiency, healthy building score, and reliability.

At 820, a user interface is provided to a mobile device associated with the user account, the user interface comprising a portion configured to display one or more of the plurality of actions on the mobile device. For example, user interface 104 may be generated for and displayed on mobile device 108A. FIG. 3A illustrates an example of a small screen user interface 304 including actions 314A, 314B.

At 830, a first subset of the plurality of actions actionable from the mobile device associated with the user account, and a second subset of the plurality of actions actionable from the another device associated with the user account are identified. For example, INS 102 may identify actions 114 that can be performed from mobile device 108A and not laptop 108B, actions 114 that can be performed from laptop 108B and not mobile device 108A, and actions 114 that can be performed by either mobile device 108A or laptop 108B. As another example, FIG. 3B includes action 314C which may only be actionable from laptop 108B and not mobile device 108A.

At 840, the first subset of the plurality of actions are provided to the user interface on the mobile device. For example, small screen user interface 304 of FIG. 3A includes actions 314A and 314B.

At 850, an indication that the action was performed is receiving from via the user interface on the mobile device. For example, as illustrated in FIG. 4B, box 446 may be an indication from a user 106 that an action was performed. While the interface 444 is illustrated on a laptop device 108B, INS 102 may generate a version of the interface for the mobile device 108A where a user can indicate when an action is completed. Or, for example, in FIG. 2B, when the work order is completed by service technician 230D, the service technician 230C may dismiss the notification, send an email, or mark a check box on user interface 104 indicating the work order was completed.

At 860, a key performance indicator of the one or more key performance indicators corresponding to the action that was indicated as being performed is identified. For example, in FIG. 3B, when an action 314A-C is completed, the corresponding KPI(s) 316A-F may be identified.

At 870, a value of the identified key performance indicator is updated. For example, a score 120 of the completed action 114 may be applied to an existing value of a KPI 116 to compute a new KIP 116 score. In FIG. 3A, if action 314B is completed, the financials KPI 316A may increase 10%. As such, the new financials KPI 316 may be $45M+$4.5M=$49.5M.

At 880, the updated value is provided to the user interface on the mobile device. For example, in FIG. 3A, if action 314B is completed, the financials KPI 316A may increase 10%. As illustrated in FIG. 3B, the new financials KPI 316 may be $45M+$4.5M=$49.5M. In an embodiment, the updated KPI 116 score may be provided via a notification 126 to one or more users 106 associated with the updated KPI 116 (as determined based on organization chart 128).

Figure 9:
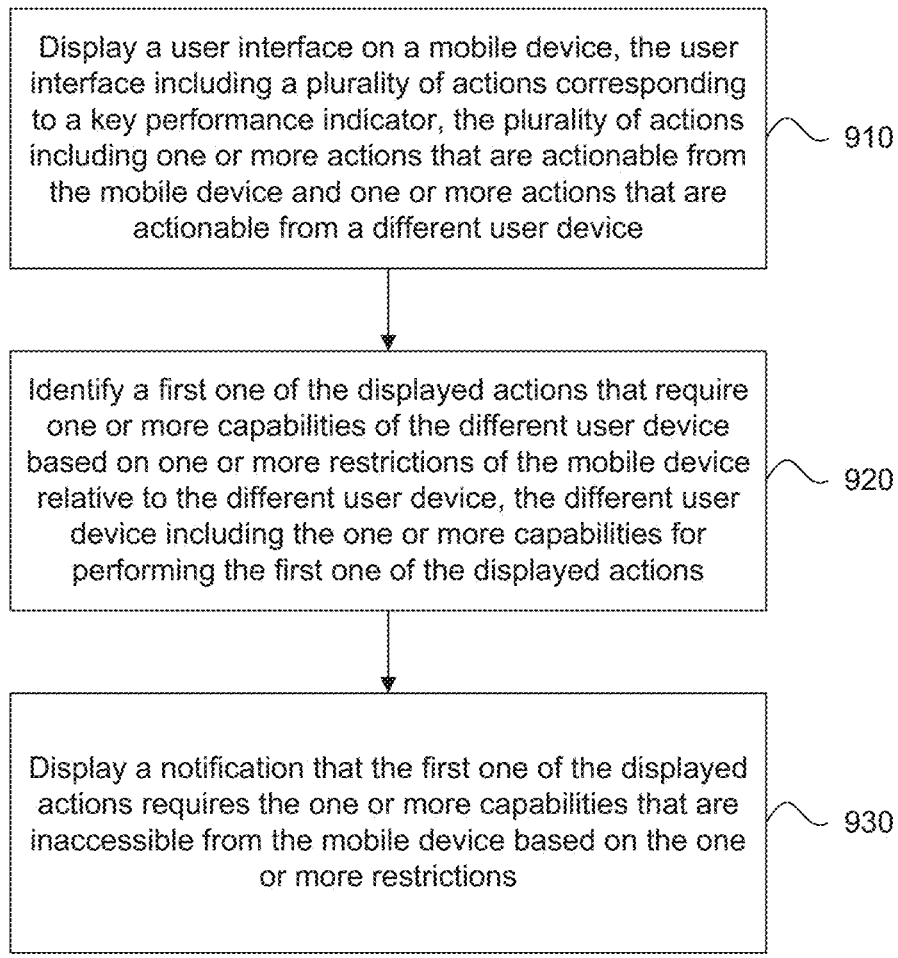
FIG. 9 is a flowchart illustrating example operations for providing a notification to a mobile device directing a user to another device to take an action, according to some embodiments.

FIG. 9 is a flowchart 900 illustrating example operations for providing a notification to a mobile device directing a user to another device to take an action, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Without limiting method 900, method 900 is described with reference to elements in FIG. 1.

At 910, a user interface is displayed on a mobile device, the user interface including a plurality of actions corresponding to a key performance indicator, the plurality of actions including one or more actions that are actionable from the mobile device and one or more actions that are actionable from a different user device. For example, INS 102 may display user interface 104 on mobile device 108A as a small screen user interface 304. The user interface 104 may include affordances 110 representing actions 114 that are actionable from any number of devices 108, including but not limited to mobile device 108A and laptop 108B. The actions 114 may have scores 130 that impact particular KPIs 116. Example actions 114 include changing a filter, assigning task, and checking the temperature on a thermostat.

At 920, a first one of the displayed actions that require one or more capabilities of the different user device is identified based on one or more restrictions of the mobile device relative to the different user device, the different user device including the one or more capabilities for performing the first one of the displayed actions. For example, device detector 124 may detect a device 108 a user 106 uses to login to INS 102. In an embodiment, each action 114 may have a device ID 112 that indicates any special computing requirements to perform the action. Example device IDs 112 include a particular screen size, style of interaction (e.g., keyboard, mouse, touchscreen, stylus, headset, microphone, etc.), memory requirements, or processing speed.

At 930, a notification that the first one of the displayed actions requires the one or more capabilities that are inaccessible from the mobile device based on the one or more restrictions is displayed. For example, device detector 124 may determine that user 106A has logged in through mobile device 108A. However one or more of the actions 114 displayed on user interface 104 may require the computing capabilities of laptop 108B. As such, INS 102 may provide a visual indicator, such as changing the font or including an icon with regard to the affordances 110 representing the mobile device actions 114 indicating that those actions require the capabilities of the laptop 108B.

Figure 10:
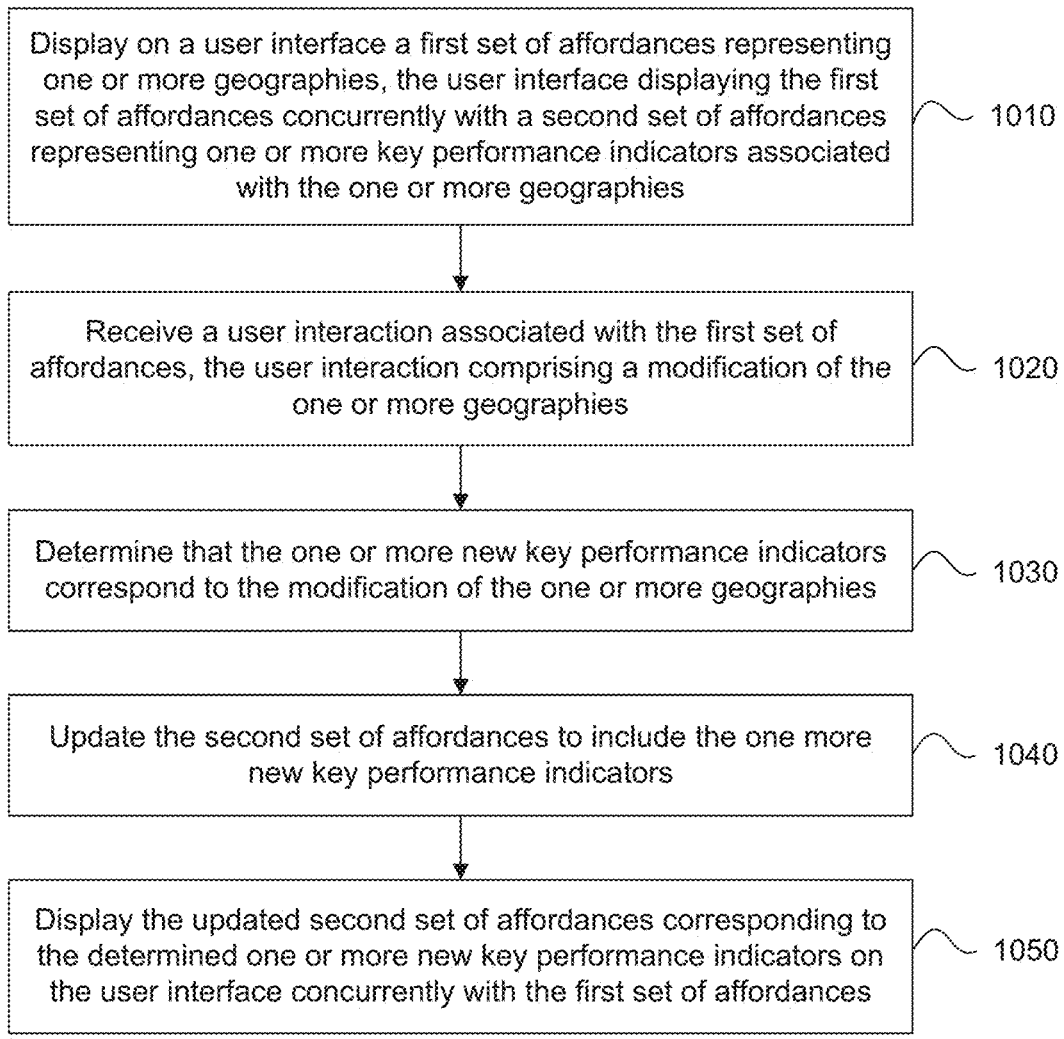
FIG. 10 is a flowchart illustrating example operations for providing an interaction and notification system (INS), according to some embodiments.

FIG. 10 is a flowchart 1000 illustrating example operations for providing an interaction and notification system (INS) 102, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art. Without limiting method 1000, method 1000 is described with reference to elements in FIG. 1.

At 1010, a first set of affordances representing one or more geographies are displayed on a user interface, the user interface displaying the first set of affordances concurrently with a second set of affordances representing one or more key performance indicators associated with the one or more geographies. For example, the big screen user interface 344 of FIG. 3B includes various geographies in map section 324A of data section 324. The affordances representing the geographies, as indicated by the circles, are displayed concurrently and in a non-overlapping manner with affordances representing various KPIs 316A-F.

At 1020, a user interaction associated with the first set of affordances is received, the user interaction comprising a modification of the one or more geographies. For example, in FIG. 3B, a user 106 may zoom in or zoom out on the map 324A, select one of the circular affordances, search for a particular vehicle, building, state, city, country, or region, etc.

At 1030, it is determined that one or more new key performance indicators correspond to the modification of the one or more geographies. For example, a user 106 may select the affordance corresponding to circle 23. INS 102 may identify, from database 112, a new set of KPIs 116 corresponding to selected geographic affordance.

At 1040, the second set of affordances to include the one more new key performance indicators is updated. For example, INS 102 may update the KPIs 316A-F displayed in big screen user interface 344 corresponding to selection or modification of a geographic affordance in section 324A.

At 1050, the updated second set of affordances corresponding to the determined one or more new key performance indicators on the user interface are displayed concurrently with the first set of affordances. For example, INS 102 may display the updated KPIs 316A-F which a more detailed view of the geographic region corresponding to affordance 23 within the map section 324A. INS 102 may also update the actions 314A-C in accordance with the new KPIs 316A-F. In an embodiment, the number of KPIs 316A-F and/or actions 314A-C may vary based on the selection or modification of data or geographic affordance from section 324 relative to the number of KPIs 316A-F and/or actions 314A-C prior to the selection or modification.

Figure 11:
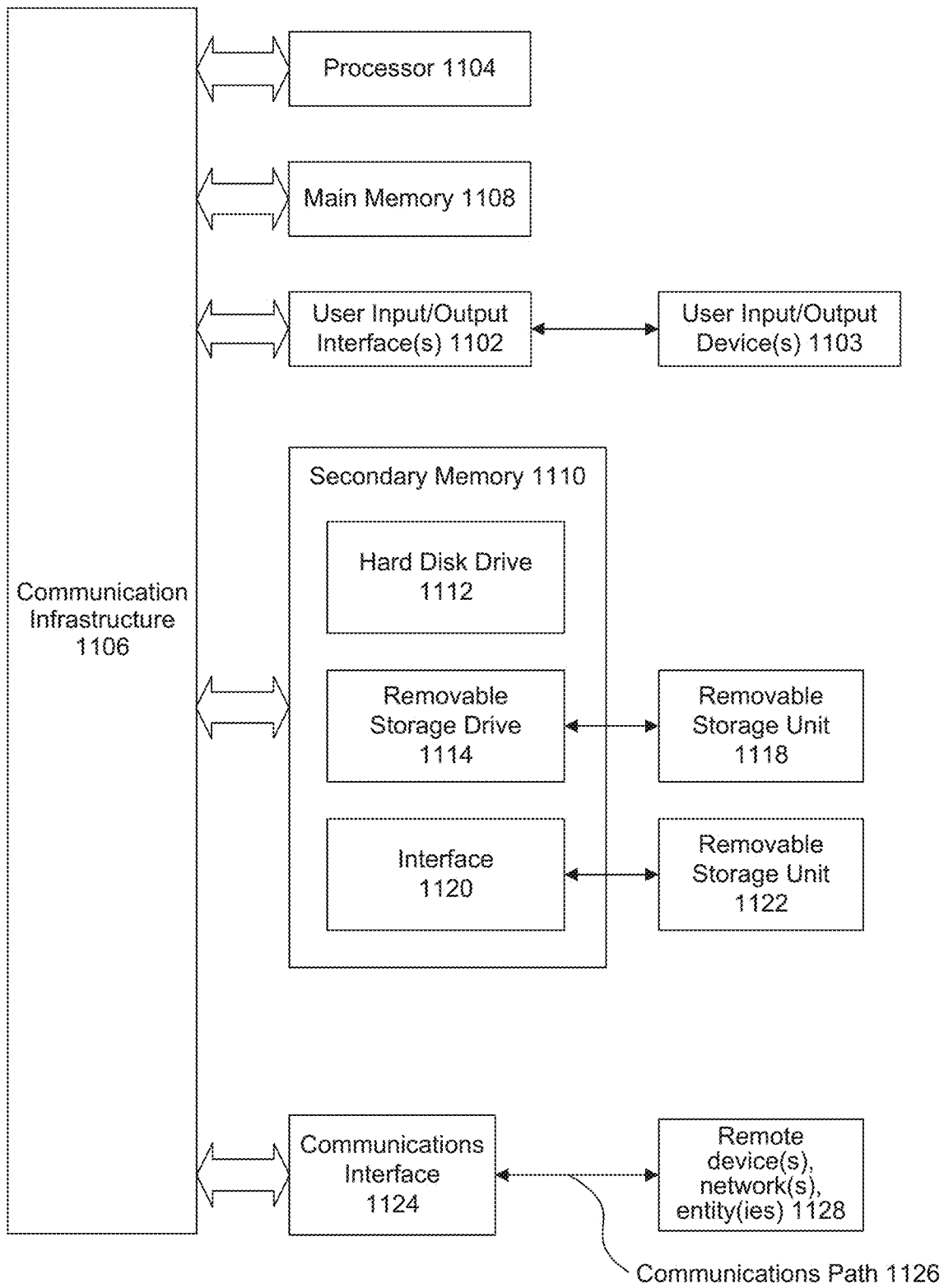
FIG. 11 illustrates an example computer system useful for implementing various embodiments.

Various embodiments may be implemented, for example, using one or more well-known computer systems, such as computer system 1100 shown in FIG. 11. One or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include customer input/output device(s) 1103, such as monitors, keyboards, pointing devices, etc., which may communicate with communication infrastructure 1106 through customer input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
    determining by a device detector, a type of a first device amongst a set of devices associated with a user through which a user logs into a user account, wherein the type of the first device is determined based at least in part of one or more device specifications of each set of devices associated with the user and an identifier of the first device, wherein the one or more device specifications corresponds to a computing capability of the each device, including at least processing power and screen resolution, wherein the device detector is communicatively coupled to the first device via a network interface, and wherein the determining comprises automatically querying the one or more device specifications upon user login and comparing the one or more device specifications to a set of device configurations stored in a database to classify the type of the first device;
    retrieving by the device detector from the database, one or more actions associated with the user account, wherein the one or more actions are stored in the database, wherein the one or more actions are associated with a key performance indicator of a plurality of key performance indicators associated with the account, and wherein the key performance indicator being below a predetermined threshold indicates that a maintenance action should be performed on an equipment in a facility, and wherein the key performance indicator is prioritized based on the user account;
    identifying by the device detector, at least one first action of the one or more actions associated with the prioritized key performance indicator based on the type of first device, wherein the at least one first action is actionable from the first device in which the user logs into the user account;
    prioritizing the one or more actions that impacts a value of the prioritized key performance indicator selected by the user, wherein the prioritization is based on actions that increase the value of the selected key performance indicator; and
    providing by the device detector, the at least one first action and prioritized one or more actions for display on a user interface on the first device based on the one or more device specifications, wherein the user interface is customized based on the type of the first device by at least changing a display order, font size, font characteristic, font type, and present at least one action executable on the detected type of first device based on its processing power and screen resolution.

2. The method of claim 1, further comprising: identifying by the device detector, the plurality of key performance indicators upon the user logging into the account, wherein the plurality of key performance indicators are associated with operations related to one of: building management systems, industrial plants, or aircraft subsystems.

3. The method of claim 1, further comprising: identifying by the device detector, at least one second action of the one or more actions that is actionable from a second device, wherein the at least one second action is identified in response to the user logging into the user account via the second device, and wherein the at least one second action is different from the at least one first action, and wherein the second device is different from the first device.

4. The method of claim 1, further comprising:
    determining by the device detector, a performance of the first action; and
    updating by the device detector, based on the performance, the user interface of the device to display a new highest priority key performance indicator.

5. The method of claim 1, further comprising:
    computing by the device detector, a variance between the plurality of key performance indicator and targets; and
    prioritizing by the device detector, the plurality of key performance indicators based on the variance, wherein each key performance indicator comprises the one or more actions associated with a score to measure a performance of the user, wherein the one or more actions associated with the score increases value of the plurality of key performance indicator when completed, and wherein the plurality of key performance indicator is based on user role, day, and time.

6. The method of claim 1, further comprises of:
sending at least one notification to the user to perform at least an action associated with the key performance indicator, wherein the notification is sent to the user based on at least an organization chart.

7. A system, comprising:
a memory;
at least one processor; and
a device detector, wherein the device detector is communicatively coupled to the memory and the at least one processor, and wherein the device detector is configured to perform operations comprising:
determining a type of a first device amongst a set of devices associated with a user through which a user logs into a user account wherein the type of the first device is determined based at least in part of one or more device specifications of each set of devices associated with the user and an identifier of the first device, wherein the one or more device specifications corresponds to a computing capability of the each device, including at least processing power and screen resolution, wherein the device detector is communicatively coupled to the first device via a network interface, and wherein the determining comprises automatically querying the one or more device specifications upon user login and comparing the one or more device specifications to a set of device configurations stored in a database to classify the type of the first device;
retrieving from the database, one or more actions associated with the user account, wherein the one or more actions are stored in the database, wherein the one or more actions are associated with a key performance indicator of a plurality of key performance indicators associated with the account, and wherein the key performance indicator being below a predetermined threshold indicates that a maintenance action should be performed on an equipment in a facility, and wherein the key performance indicator is prioritized based on the user account;
identifying, at least one first action of the one or more actions associated with the prioritized key performance indicator based on the type of first device, wherein the at least one first action is actionable from the device in which the user logs into the user account;
prioritize the one or more actions that impacts a value of the prioritized key performance indicator selected by the user, wherein the prioritization is based on actions that increase the value of the selected key performance indicator; and
providing the at least one first action and prioritized one or more actions for display on a user interface on the first device based on the one or more device specifications, wherein the user interface is customized based on the type of the first device by at least changing a display order, font size, font characteristic, font type, and present at least one action executable on the detected type of first device based on its processing power and screen resolution.

8. The system of claim 7, wherein the plurality of key performance indicators are associated with operations related to one of: building management systems, industrial plants, or aircraft subsystems.

9. The system of claim 7, wherein the device type is one of the first device or a second device, and wherein at least one second action is identified in response to the user logging into the user account via the second device, and wherein the at least one second action is different from the at least one first action, and wherein the second device is different from the first device.

10. The system of claim 9, wherein the second device has one of: a larger screen than the first device, greater computing capabilities than the first device, or both a larger screen and greater computing capabilities than the first device.

11. The system of claim 10, wherein a different subset of actions are actionable from either the second device or the first device.

12. The system of claim 11, wherein the determined device type comprises the second device, and wherein the subset of the one more actions only actionable from the second device are displayed in the user interface with greater visual priority.

13. The system of claim 7, wherein the determined device comprises the first device, and wherein an indicator is displayed on the user interface of the first device indicating that the subset of the one or more actions that are not displayed in the user interface of the device are actionable from a different device type.

14. The system of claim 7, wherein the operations further comprise:
determining a performance of the first action; and
updating, based on the performance, the user interface of the device to display a new highest priority key performance indicator.

15. The system of claim 7, wherein the one or more actions associated with a score increases value of the plurality of key performance indicator when completed and the plurality of key performance indicator is based on user role, day, and time.

16. The system of claim 7, wherein the operations further comprise:
compute a variance for the one or more actions between the key performance indicator and targets; and
prioritize the plurality of key performance indicators based on the variance, wherein each key performance indicator comprises the one or more actions associated with a score to measure a performance of the user, wherein the one or more actions associated with the score increases value of the plurality of key performance indicator when completed, and wherein the plurality of key performance indicator is based on user role, day, and time.

17. The system of claim 7, wherein the system adjusts a user interface based on the identification of the type of first device.

18. A non-transitory computer-readable device having instructions stored thereon that, when executed by at least one computing device communicatively coupled to a device detector, cause the at least one computing device to perform operations comprising:
determining a device type of a first device through which a user logs into a user account wherein the type of the first device is determined based at least in part of one or more device specifications of each set of devices associated with the user and an identifier of the first device, wherein the one or more device specifications corresponds to a computing capability of the each device, including at least processing power and screen resolution, wherein the device detector is communicatively coupled to the first device via a network interface, and wherein the determining comprises automatically querying the one or more device specifications upon user login and comparing the one or more device specifications to a set of device configurations stored in a database to classify the type of the first device;

retrieving from the database, one or more actions associated with the user account, wherein the one or more actions are stored in the database, wherein the one or more actions are associated with a key performance indicator of a plurality of key performance indicators associated with the account, and wherein the key performance indicator being below a predetermined threshold indicates that a maintenance action should be performed on an equipment in a facility, and wherein the key performance indicator is prioritized based on the user account;

identifying, at least one first action of the one or more actions associated with the prioritized key performance indicator based on the type of first device, wherein the at least one first action is actionable from the first device in which the user logs into the user account;

prioritizing the one or more actions that impacts a value of the prioritized key performance indicator selected by the user, wherein the prioritization is based on actions that increase the value of the selected key performance indicator; and providing the at least one first action and prioritized one or more actions for display on a user interface on the first device based on the one or more device specifications, wherein the user interface is customized based on the type of the first device by at least changing a display order, font size, font characteristic, font type, and present at least one action executable on the detected type of first device based on its processing power and screen resolution.

19. The device of claim 18, wherein the plurality of key performance indicators are associated with operations related to one of: building management systems, industrial plants, or aircraft subsystems.

20. The device of claim 18, wherein the device type is one of a first device or a second device, and wherein at least one second action is identified in response to the user logging into the user account via the second device, and wherein the at least one second action is different from the at least one first action, and wherein the second device is different from the first device.

* * * * *